United States Patent
Klein et al.

(10) Patent No.: US 11,481,118 B2
(45) Date of Patent: Oct. 25, 2022

(54) STORAGE MEDIA PROGRAMMING WITH ADAPTIVE WRITE BUFFER RELEASE

(71) Applicant: Marvell Asia Pte, Ltd., Singapore (SG)

(72) Inventors: Steven A. Klein, Costa Mesa, CA (US); Viet-Dzung Nguyen, San Jose, CA (US); Gregory Burd, San Jose, CA (US)

(73) Assignee: Marvell Asia PTE, Ltd., Singapore (SG)

( * ) Notice: Subject to any disclaimer, the term of this patent is extended or adjusted under 35 U.S.C. 154(b) by 360 days.

(21) Appl. No.: 16/737,137

(22) Filed: Jan. 8, 2020

(65) Prior Publication Data
US 2020/0225851 A1 Jul. 16, 2020

Related U.S. Application Data

(60) Provisional application No. 62/791,542, filed on Jan. 11, 2019.

(51) Int. Cl.
*G06F 3/06* (2006.01)
*G06F 9/30* (2018.01)
(Continued)

(52) U.S. Cl.
CPC .......... *G06F 3/0613* (2013.01); *G06F 3/0619* (2013.01); *G06F 3/0656* (2013.01);
(Continued)

(58) Field of Classification Search
CPC .... G06F 3/0613; G06F 3/0619; G06F 3/0679; G06F 3/0689; G06F 9/30029
See application file for complete search history.

(56) References Cited

U.S. PATENT DOCUMENTS 6,671,791 B1 12/2003 McGrath
9,015,351 B1 4/2015 Geddes et al.
(Continued)

FOREIGN PATENT DOCUMENTS

CN 1708742 12/2005
CN 106487719 3/2017
(Continued)

OTHER PUBLICATIONS

"Foreign Office Action", EP Application No. 19190610.6, dated Sep. 7, 2021, 8 pages.
(Continued)

*Primary Examiner* — Henry Tsai
*Assistant Examiner* — Christopher A Daley

(57) ABSTRACT

The present disclosure describes apparatuses and methods for storage media programming with adaptive write buffer release. In some aspects, a media write manager of a storage media system stores, to a write buffer, data received from a host interface. The media write manager determines parity information for the data stored to the write buffer and then releases the write buffer on completion of determining the parity information for the data. The media write manager may then write at least a portion of the data to storage media after the write buffer is released. By releasing the write buffer of the storage media system after determining the parity information, the write buffer is freed more quickly, which may result in improved write buffer utilization and increased write throughput of the storage media system.

20 Claims, 17 Drawing Sheets

(51) Int. Cl.
*G06F 11/07* (2006.01)
*G06F 11/10* (2006.01)

(52) U.S. Cl.
CPC .......... *G06F 3/0679* (2013.01); *G06F 3/0689* (2013.01); *G06F 9/30029* (2013.01); *G06F 11/0772* (2013.01); *G06F 11/1044* (2013.01); *G06F 11/1076* (2013.01)

(56) References Cited

U.S. PATENT DOCUMENTS

| | | | |
|---|---|---|---|
| 9,747,039 B1 | 8/2017 | Coleman et al. | |
| 10,228,874 B2 | 3/2019 | Wysocki et al. | |
| 10,318,324 B2 | 6/2019 | Carson et al. | |
| 10,956,346 B1 | 3/2021 | Ben-Yehuda et al. | |
| 11,010,314 B2 | 5/2021 | Therene et al. | |
| 11,055,232 B2 | 7/2021 | Keppel et al. | |
| 11,074,013 B2 | 7/2021 | Salil et al. | |
| 11,372,580 B2 | 6/2022 | Guo et al. | |
| 2005/0182948 A1 | 8/2005 | Ducharme | |
| 2007/0260825 A1 | 11/2007 | Yudenfriend et al. | |
| 2008/0100636 A1 | 5/2008 | Lai et al. | |
| 2008/0177974 A1 | 7/2008 | Chiang et al. | |
| 2009/0077333 A1* | 3/2009 | Byrne | G06F 12/1458 711/E12.001 |
| 2010/0169382 A1 | 7/2010 | Sheaffer et al. | |
| 2011/0154318 A1 | 6/2011 | Oshins et al. | |
| 2012/0010772 A1 | 1/2012 | Pack et al. | |
| 2012/0151178 A1 | 6/2012 | Brownlow et al. | |
| 2012/0183001 A1 | 7/2012 | Suzuki et al. | |
| 2012/0192178 A1 | 7/2012 | Brownlow et al. | |
| 2013/0145231 A1* | 6/2013 | Frayer | H03M 13/2906 714/763 |
| 2013/0179877 A1 | 7/2013 | Dain | |
| 2013/0254146 A1 | 9/2013 | Ellis et al. | |
| 2014/0089233 A1 | 3/2014 | Ellis et al. | |
| 2014/0096132 A1 | 4/2014 | Wang et al. | |
| 2014/0143558 A1 | 5/2014 | Kuesel | |
| 2014/0281106 A1 | 9/2014 | Saghi et al. | |
| 2015/0317088 A1 | 11/2015 | Hussain et al. | |
| 2015/0378884 A1 | 12/2015 | Nemazie et al. | |
| 2016/0224248 A1 | 8/2016 | Choi et al. | |
| 2016/0267016 A1 | 9/2016 | Lee et al. | |
| 2016/0292007 A1 | 10/2016 | Ding et al. | |
| 2016/0371014 A1 | 12/2016 | Roberts | |
| 2017/0024132 A1 | 1/2017 | Jun et al. | |
| 2017/0031816 A1 | 2/2017 | Lee et al. | |
| 2017/0070241 A1 | 3/2017 | Kaku et al. | |
| 2017/0123901 A1* | 5/2017 | Zhao | G11C 7/1006 |
| 2017/0124463 A1 | 5/2017 | Chen et al. | |
| 2017/0149733 A1 | 5/2017 | Chastain et al. | |
| 2017/0220410 A1 | 8/2017 | Kim et al. | |
| 2017/0235510 A1 | 8/2017 | Hu et al. | |
| 2017/0269876 A1* | 9/2017 | Mukhopadhyay | G11C 16/26 |
| 2017/0277573 A1 | 9/2017 | Huynh | |
| 2018/0032249 A1 | 2/2018 | Makhervaks et al. | |
| 2018/0088804 A1 | 3/2018 | Mummidi et al. | |
| 2018/0181302 A1 | 6/2018 | Liu | |
| 2018/0210754 A1 | 7/2018 | Vaish et al. | |
| 2018/0217951 A1 | 8/2018 | Benisty et al. | |
| 2018/0307622 A1 | 10/2018 | Smith et al. | |
| 2018/0373450 A1* | 12/2018 | Ji | G06F 3/0679 |
| 2019/0042799 A1 | 2/2019 | Durham et al. | |
| 2019/0050295 A1 | 2/2019 | Ding et al. | |
| 2019/0146823 A1 | 5/2019 | Rewaskar et al. | |
| 2019/0266117 A1 | 8/2019 | Duncan et al. | |
| 2019/0278620 A1 | 9/2019 | Korbar et al. | |
| 2019/0354599 A1 | 11/2019 | Mital et al. | |
| 2020/0004701 A1* | 1/2020 | Subbarao | G11C 29/52 |
| 2020/0042341 A1 | 2/2020 | Gupta et al. | |
| 2020/0050385 A1 | 2/2020 | Furey et al. | |
| 2020/0050403 A1 | 2/2020 | Suri et al. | |
| 2020/0050470 A1 | 2/2020 | Guo et al. | |
| 2020/0104056 A1 | 4/2020 | Benisty et al. | |
| 2020/0133898 A1 | 4/2020 | Therene et al. | |
| 2020/0286562 A1* | 9/2020 | Gorobets | G11C 16/26 |
| 2020/0310997 A1 | 10/2020 | Chen et al. | |
| 2020/0371954 A1 | 11/2020 | Li et al. | |
| 2021/0271611 A1 | 9/2021 | Therene et al. | |

FOREIGN PATENT DOCUMENTS

| | | |
|---|---|---|
| JP | 2009251751 | 10/2009 |
| WO | 2020089759 | 5/2020 |

OTHER PUBLICATIONS

"Non-Final Office Action", U.S. Appl. No. 16/533,376, dated Oct. 4, 2021, 29 pages.
Dunlap, "The Intel Sysret Privilege Escalation", XenProject, Jun. 13, 2012, 7 pages.
"International Preliminary Report on Patentability", Application No. PCT/IB2019/059194, dated Apr. 27, 2021, 9 pages.
"EP Search Report", EP Application No. 19190610.6, dated Dec. 20, 2019, 11 pages.
"Extended European Search Report", European Application No. 19190611.4, dated Jan. 8, 2020, 12 pages.
"Extended European Search Report", European Application No. 20151268.8, dated May 18, 2020, 7 pages.
"International Search Report and Written Opinion", PCT Application No. PCT/IB2019/059194, dated Jan. 22, 2020, 14 pages.
Wang, et al., "SWANS: An Interdisk Wear-Leveling Strategy for RAID-0 Structured SSD Arrays", ACM Transactions on Storage, vol. 12, No. 3, Article 10, Apr. 2016, 22 pages.
"Foreign Office Action", European Application No. 19190606.4, dated Jan. 28, 2021, 6 pages.
"Notice of Allowance", U.S. Appl. No. 16/664,528, dated Jan. 6, 2021, 9 pages.
"Notice of Allowance", U.S. Appl. No. 16/533,399, dated Mar. 23, 2021, 8 pages.
"Non-Final Office Action", U.S. Appl. No. 16/664,528, dated Sep. 18, 2020, 11 Pages.
"Non-Final Office Action", U.S. Appl. No. 16/533,399, dated Dec. 10, 2020, 20 pages.
"Foreign Office Action", EP Application No. 19190611.4, dated Dec. 10, 2021, 8 pages.
"Notice of Allowance", U.S. Appl. No. 16/533,376, dated Feb. 24, 2022, 9 pages.
"Foreign Office Action", EP Application No. 19190606.4, dated Apr. 21, 2022, 8 pages.
"Non-Final Office Action", U.S. Appl. No. 16/533,243, dated Jun. 21, 2022, 8 pages.
"Notice of Allowance", U.S. Appl. No. 17/320,096, dated May 17, 2022, 12 pages.
"Foreign Office Action", EP Application No. 19797810.9, dated Aug. 18, 2022, 10 pages.
"Foreign Office Action", CN Application No. 201910727158.1, dated Jul. 22, 2022, 5 pages.

* cited by examiner

STORAGE MEDIA PROGRAMMING WITH ADAPTIVE WRITE BUFFER RELEASE

CROSS REFERENCE TO RELATED APPLICATION

This present disclosure claims priority to U.S. Provisional Patent Application Ser. No. 62/791,542 filed Jan. 11, 2019, the disclosure of which is incorporated by reference herein in its entirety.

BACKGROUND

Many computing and electronic devices include non-volatile memory for storing software, applications, or data of the device. Additionally, most users stream data or access services with their devices, such as multimedia content or social media applications, over data networks from various locations or on the move. With users' ever-increasing demand for data and services, storage providers have scaled up capacity and performance of storage drives to support the data access associated with these activities of users and other data storage clients. Typically, a storage drive of a device includes storage media to which data of the device is written. To do so, the device issues write commands to the storage drive, which in turn writes the data to the storage media as specified by each command Thus, storage drive write performance generally depends on a rate at which the storage drive is able to complete the data write commands of the device or the storage client.

Storage drives often include write buffers for receiving data from the device that corresponds to the write commands. The storage drive then sends the data from the write buffers to a programming interface of the storage media. A programming or write speed of the storage media, however, is typically much slower than that of the write buffers. Additionally, most storage drives keep a copy of the data in the write buffers until the data is successfully programmed to the storage media to enable data recovery when storage media programming fails, and the data is lost. As such, the write buffers of the storage drive may be held or occupied for an extended amount of time due to the slower programming speed of the storage media. This prevents the write buffers from receiving subsequent data until storage media programming completes, which decreases a write throughput of the storage drive or requires an increased amount of write buffer to maintain the write throughput.

SUMMARY

This summary is provided to introduce subject matter that is further described in the Detailed Description and Drawings. Accordingly, this Summary should not be considered to describe essential features nor used to limit the scope of the claimed subject matter.

In some aspects, a media write manager of a storage media system implements a method that stores, to a write buffer, data received from a host interface of a storage system that includes storage media. The method determines, via a parity-based encoder, parity information for the data stored to the write buffer. Alternatively or additionally, the data may be transferred to another internal buffer of the storage media system. The write buffer is then released in response to completion of the determining of the parity information for the data. The method also includes writing at least a portion of the data to the storage media of the storage system after the write buffer is released from storing the data.

In other aspects, an apparatus comprises a host interface configured for communication with a host system, write buffers operably coupled to the host interface, storage media, and a media interface configured to enable access to the storage media. The apparatus also includes a parity-based encoder and a media write manager that is configured to receive, via one of the write buffers, data from the host interface. The media write manager computes, via the parity-based encoder, parity information for the data received by the write buffer and stores the parity information to a buffer of the parity-based encoder. In response to computation of the parity information for the data, the media write manager releases the write buffer and writes at least a portion of the data to the storage media of the apparatus after the write buffer is released from storing the data.

In yet other aspects, a System-on-Chip (SoC) is described that includes a host interface to communicate with a host system, write buffers operably coupled with the host interface, a media interface to access storage media of a storage system, and a parity-based encoder. The SoC also includes a hardware-based processor and a memory storing processor-executable instructions that, responsive to execution by the hardware-based processor, implement a media write manager to store, to one of the write buffers, data received from the host interface. The media write manager also determines, via the parity-based encoder, parity information for the data stored to the write buffer and releases the write buffer in response to the determining of the parity information for the data. The media write manager then writes at least a portion of the data to the storage media after the write buffer is released from storing the data.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of storage media programming with adaptive write buffer release are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
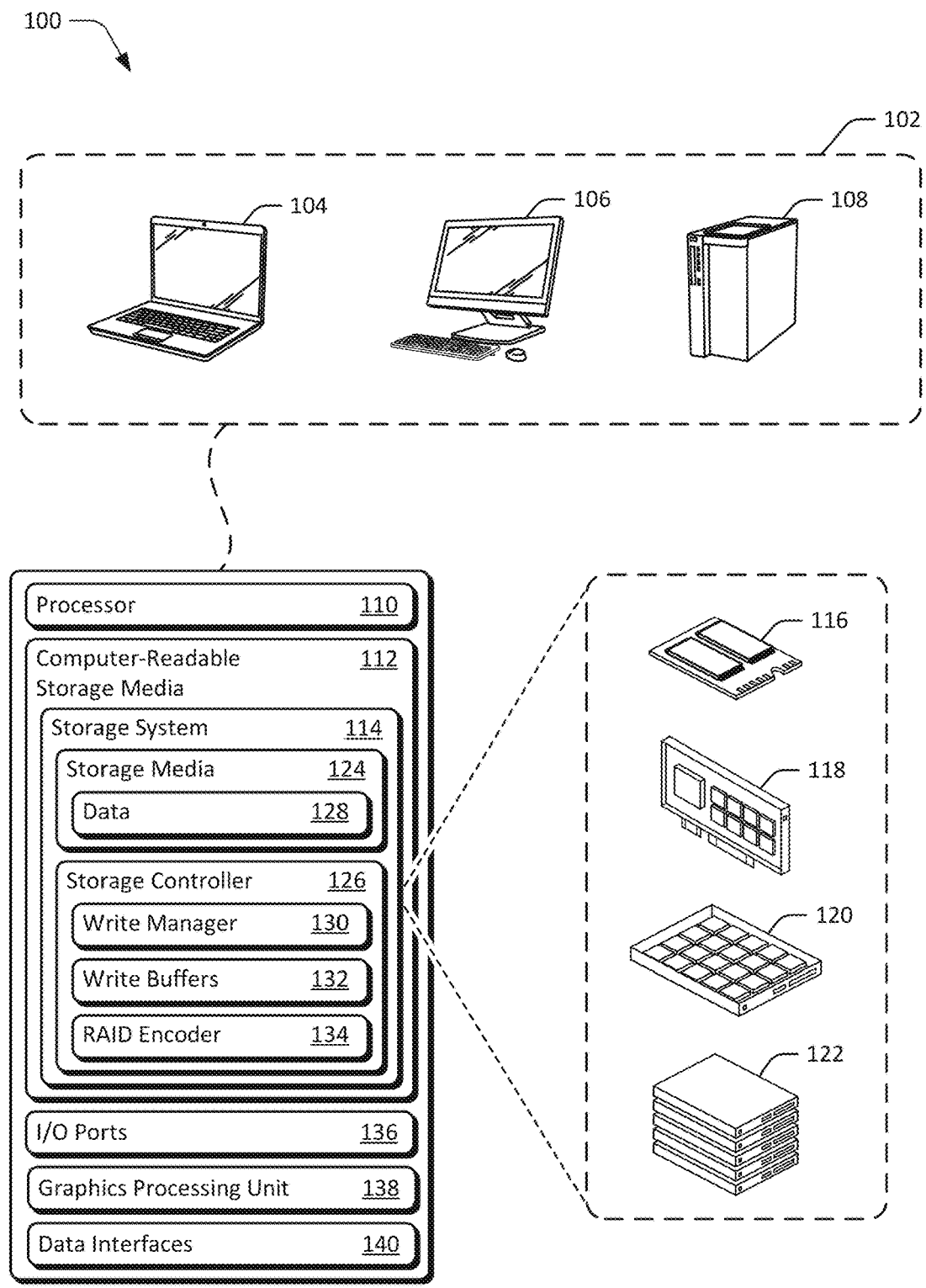
FIG. 1 illustrates an example operating environment having devices in which a media write manager is implemented in accordance with one or more aspects of the disclosure.

Conventional techniques for writing data to storage media often hold data in write buffers until the data is programmed to storage media, resulting in decreased write throughput of a storage drive or increased write buffer requirements (e.g., number or size of write buffers). Generally, storage drive firmware is used to manage a data path of the storage drive in an end-to-end manner, such as by translating data commands and managing data movement along the data path between a host interface and storage media interface. For example, the firmware may process a write command to receive corresponding data at the host interface and send that data to the storage media interface for programming to an appropriate area of the storage media.

Many storage drives operate in a "cache on" mode in which the firmware sends a host an acknowledgement for a write command as soon as data of the write command is received by a controller of the storage drive. Generally, the cache on mode is preferred because write command latency in cache on mode is lower and the host is relieved from holding data more quickly. In cache on mode, the firmware often keeps the data in write buffers of the controller until confirmation is received from the storage media indicating that a program operation transferring the data to storage media is successful. This is necessary because in the event of a program failure (e.g., a bad wordline or bad block), the firmware still has the data and may attempt to reprogram the data to the storage media.

Programming the storage media, however, takes a relatively long time (three milliseconds) compared a typical transit time of the data through a write buffer, which is on the order of tens of microseconds. In other words, data received from the host occupies the write buffers for an extended length of time primarily as a contingency for programing failures, which are rare events. Additionally, the number of write buffers implemented by a controller is often limited due to practical concerns, such as layout area, data path architecture, power consumption, cost, or the like. When the limited write buffers of the controller are constantly occupied by data awaiting programming confirmations, the controller is unable to receive additional data from the host until a write buffer becomes available. As such, the limited number and inefficient utilization of the write buffers imposes an upper-bound on write throughput and may negatively affect write performance of the storage drive.

This disclosure describes apparatuses and techniques for storage media programming with adaptive write buffer release. In contrast with conventional techniques for writing to storage media, the described apparatuses and techniques may implement a data writing scheme for storage media that includes parity-based encoding (e.g., RAID) to enable data recovery in the event of a storage media programming failure. By so doing, a media write manager of a storage controller may release write buffers as soon as parity information is computed for data being written to the storage media. Alternatively or additionally, the data may be transferred to another internal buffer of the storage media system before or concurrently with the computation of the parity information. In other words, the write buffers are released when a RAID computation of parity information (e.g., XOR information) is complete (e.g., tens of microseconds), instead of being held until a programming success confirmation is received back from the storage media (e.g., three milliseconds). Alternatively or additionally, release of the write buffer may also be conditioned on the data being copied from the write buffer to another internal buffer of the storage system or to a storage media interface for programming into storage media. Once released, the write buffers may receive subsequent data from a host, in some cases while the previously held data is programmed to the storage media. As such, the adaptive release of write buffers may result in more efficient write buffer utilization and/or enable a storage drive to be implemented with fewer or smaller write buffers. This reduction in write buffers or write buffer size may in turn decrease power consumption of a storage controller, facilitate improved integrated circuit layout, and so on.

In various aspects of storage media programming with adaptive write buffer release, a media write manager of a storage media system stores data received from a host interface to a write buffer. The media write manager determines parity information for the data while the data is stored in the write buffer and then releases the write buffer on completion of determining the parity information for the data. The media write manager may then write at least a portion of the data to storage media after the write buffer is released. By releasing write buffers of the storage media system after determining the parity information, the write buffers are freed more quickly, which may result in improved write buffer utilization and increased write throughput of the storage media system.

The following discussion describes an operating environment, techniques that may be employed in the operating environment, and a System-on-Chip (SoC) in which components of the operating environment may be embodied. In the context of the present disclosure, reference is made to the operating environment by way of example only.

Operating Environment

FIG. 1 illustrates an example operating environment 100 having a host system 102, capable of storing or accessing various forms of data or information. Examples of a host system 102 may include a laptop computer 104, desktop computer 106, and server 108, any of which may be configured as user device, computing device, or as part of a storage network or cloud storage. Further examples of host system 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on.

Generally, the host system 102 may communicate or store data for any suitable purpose, such as to enable functionalities of a particular type of device, provide a user interface, enable network access, implement gaming applications, playback media, provide navigation, edit content, provide data storage, or the like.

The host system 102 includes a processor 110 and computer-readable media 112. The processor 110 may be implemented as any suitable type or number of processors, either single-core or multi-core, for executing instructions or commands of an operating system or other applications of the host system 102. The computer-readable media 112 (CRM 112) includes memory (not shown) and a storage system 114 of the host system 102. The memory of the host system 102 may include any suitable type or combination of volatile memory or nonvolatile memory. For example, the volatile memory of host system 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NAND Flash). These memories, individually or in combination, may store data associated with a user, applications, and/or an operating system of host system 102.

The storage system 114 of the host system 102 may be configured as any suitable type of data storage system, such as a storage device, storage drive, storage array, storage volume, or the like. Although described with reference to the host system 102, the storage system 114 may also be implemented separately as a standalone device or as part of a larger storage collective, such as a network-attached storage device, external storage drive, data center, server farm, or virtualized storage system (e.g., for cloud-based storage or services). Examples of the storage system 114 include a non-volatile memory express (NVMe) solid-state drive 116, a peripheral component interconnect express (PCIe) solid-state drive 118, a solid-state drive 120 (SSD 120), and a storage array 122, which may be implemented with any combination of storage devices or storage drives.

The storage system 114 includes storage media 124 and a storage media controller 126 (storage controller 126) for managing various operations or functionalities of the storage system 114. The storage media 124 may include or be formed from non-volatile memory devices on which data 128 or information of the host system 102 is stored. The storage media 124 may be implemented with any type or combination of solid-state memory media, such as Flash, NAND Flash, RAM, DRAM (e.g., for caching), SRAM, or the like. In some cases, the data 128 stored to the storage media 124 is organized into files of data (e.g., content) or data objects that are stored to the storage system 114 and accessed by the host system 102. The file types, sizes, or formats of the data 128 may vary depending on a respective source, use, or application associated with the file. For example, the data 128 stored to the storage system 114 may include audio files, video files, text files, image files, multimedia files, spreadsheets, and so on. Although described with reference to solid-state memory, aspects of storage media programming with adaptive write buffer release may also be implanted with magnetic-based or optical-based media types.

Generally, the storage controller 126 manages operation of the storage system 114 and enables the host system 102 to access the storage media 124 for data storage. The storage controller 126 may be implemented through any suitable combination of hardware, firmware, or software to provide various functionalities of the storage system 114. The storage controller 126 may also manage or administrate internal tasks or operations associated with the storage media 124, such as data caching, data migration, garbage collection, thermal management (e.g., throttling), power management, or the like. As such, the storage controller 126 may receive host I/Os from the host system 102 for data access and queue (or generate) internal I/Os associated with internal operations for the storage media 124.

In this example, the storage controller 126 also includes a storage media write manager 130 (media write manager 130), write buffers 132, and a parity-based encoder, which is illustrated as a redundant array of independent disks (RAID) encoder 134. The write buffers 132 may receive or store data received from a host system 102 for writing to the storage media 124. The RAID encoder 134 may compute parity information (e.g., XOR bits) for data written to the storage media 124 as part of a RAID stripe. Members or units of the RAID stripe may include any suitable partition or regions of storage media, such as a die, a plane, a block, a page, a wordline, and so on. Generally, the parity information provided by the RAID encoder is useful, in combination with information from other RAID stripe members, to recover data of a RAID stripe member when a programming operation of that member fails. RAID or parity-based data recovery may provide enhanced data reliability, as well as protect against complete block or page failures of the storage media.

In various aspects, the media write manager 130 may interact with the RAID encoder 134 to compute parity information for data stored to a write buffer 132. In some cases, the data may also be transferred to another internal buffer of the storage media system before or during computation of the parity information. Instead of relying on data held in the write buffer, the media write manager 130 may use this parity information to implement data recovery if a programming operation to write the data to storage media fails. Because the parity information enables data recovery, the media write manager may then release the write buffer in response to computation of the parity information (and/or the data being transferred to another internal buffer or the storage media), freeing the write buffer 132 for reuse before or while the data is programmed to storage media. By so doing, the adaptive release of write buffers may result in improved write buffer utilization and increased write throughput of the storage media.

The host system 102 may also include I/O ports 136, a graphics processing unit 138 (GPU 138), and data interfaces 140. Generally, the I/O ports 136 allow a host system 102 to interact with other devices, peripherals, or users. For example, the I/O ports 136 may include or be coupled with a universal serial bus, human interface devices, audio inputs, audio outputs, or the like. The GPU 138 processes and renders graphics-related data for host system 102, such as user interface elements of an operating system, applications, or the like. In some cases, the GPU 138 accesses a portion of local memory to render graphics or includes dedicated memory for rendering graphics (e.g., video RAM) of the host system 102.

The data interfaces 140 of the host system 102 provide connectivity to one or more networks and other devices connected to those networks. The data interfaces 140 may include wired interfaces, such as Ethernet or fiber optic interfaces for communicated over a local network, intranet, or the Internet. Alternately or additionally, the data interfaces 140 may include wireless interfaces that facilitate communication over wireless networks, such as wireless Local Area Networks (LANs), wide-area wireless networks (e.g., cellular networks), and/or wireless personal-area-networks (WPANs). Any of the data communicated through the I/O ports 136 or the data interfaces 140 may be written to or read from the storage system 114 of the host system 102 in accordance with one or more aspects of storage media programming with adaptive write buffer release.

Figure 2:
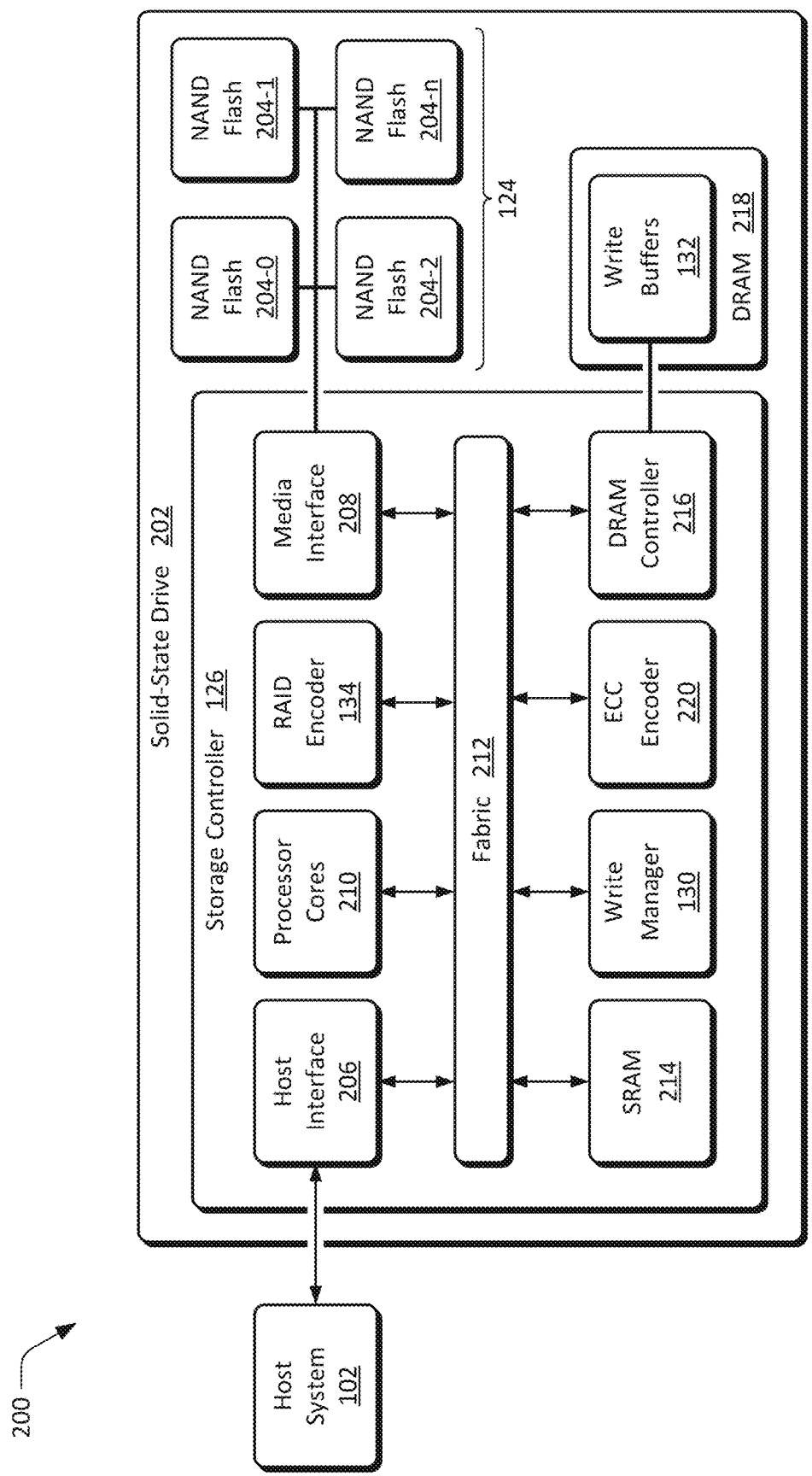
FIG. 2 illustrates an example configuration of a solid-state drive in which the media write manager, write buffers, and Redundant Array of Independent Disks (RAID) encoder of FIG. 1 may be implemented in accordance with various aspects.

FIG. 2 illustrates at 200 an example configuration of a solid-state drive 202 in which the media write manager, write buffers, and RAID encoder may be implemented in accordance with one or more aspects. In this example, the media write manager 130 and other components are illustrated in the context of a storage system 114 that is implemented as the solid-state storage drive (SSD) 202. The SSD 202 may be coupled to any suitable host system 102 and implanted with storage media 124 that includes multiple NAND Flash devices 204-0 through 204-$n$, where n is any suitable integer. In some cases, the NAND Flash devices 204 include multiple Flash channels of memory devices, dies, or chips that may be accessible or managed on a channel-level (group of devices) or device-level (individual devices). Although illustrated as a component of the storage controller 126, the media write manager 130 may be implemented separately from or external to a storage controller. In some cases, the media write manager 130 is implemented as part of a memory interface, such as a DRAM controller or interface associated with a storage controller.

Generally, operations of the SSD 202 are enabled or managed by an instance of the storage controller 126, which in this example includes a host interface 206 to enable communication with the host system 102 and a media interface 208 to enable access to the storage media 124. The host interface 206 may be configured to implement any suitable type of storage interface or protocol, such as serial advanced technology attachment (SATA), universal serial bus (USB), PCIe, advanced host controller interface (AHCI), NVMe, NVM-over Fabric (NVM-OF), NVM host controller interface specification (NVMHCIS), small computer system interface (SCSI), serial attached SCSI (SAS), secure digital I/O (SDIO), Fibre channel, any combination thereof (e.g., an M.2 or next generation form-factor (NGFF) combined interface), or the like. Alternately or additionally, the media interface 208 may implement any suitable type of storage media interface, such as a Flash interface, Flash bus channel interface, NAND channel interface, physical page addressing (PPA) interface, or the like.

In various aspects, components of the SSD 202 or storage controller 126 provide a data path between the host interface 206 to the host system 102 and the media interface 208 to the storage media 124. In this example, the storage controller 126 includes processor cores 210 for executing a kernel, firmware, or drivers to implement functions of the storage controller 126. In some cases, the processor cores 210 may also execute processor-executable instructions to implement the media write manager 130 of the storage controller 126. Alternately or additionally, the media write manager 130 may execute from or run on hardware associated with the RAID encoder 134.

As shown in FIG. 2, a fabric 212 of the storage controller 126, which may include control and data buses, operably couples and enables communication between the components of the storage controller 126. For example, the media write manager 130 may communicate with the write buffers 132, RAID encoder 134, or processor cores 210 (e.g., firmware) to exchange data, information, or control signaling (e.g., buffer release interrupts) within the storage controller 126. A static random-access memory 214 of the storage controller 126 may store processor-executable instructions or code for firmware or drivers of the storage controller, which may be executed by the processor cores 210. Alternately or additionally, the write buffers 132 of the storage controller 126 may be implemented in the SRAM 214 of the controller.

In this example, the storage controller 126 includes a dynamic random-access memory (DRAM) controller 216 and associated DRAM 218 for storage or caching various data as the storage controller 126 moves data between the host system 102, storage media 124, or other components of the storage controller. As shown in FIG. 2, an instance of the write buffers 132 are implemented in the DRAM 218 and may be accessed or managed through the DRAM controller 216. The storage controller 126 also includes an error-correcting code (ECC) encoder 220, which may be used to ECC-encode data that is programmed or written to the storage media 124 of the SSD 202.

Figure 3:
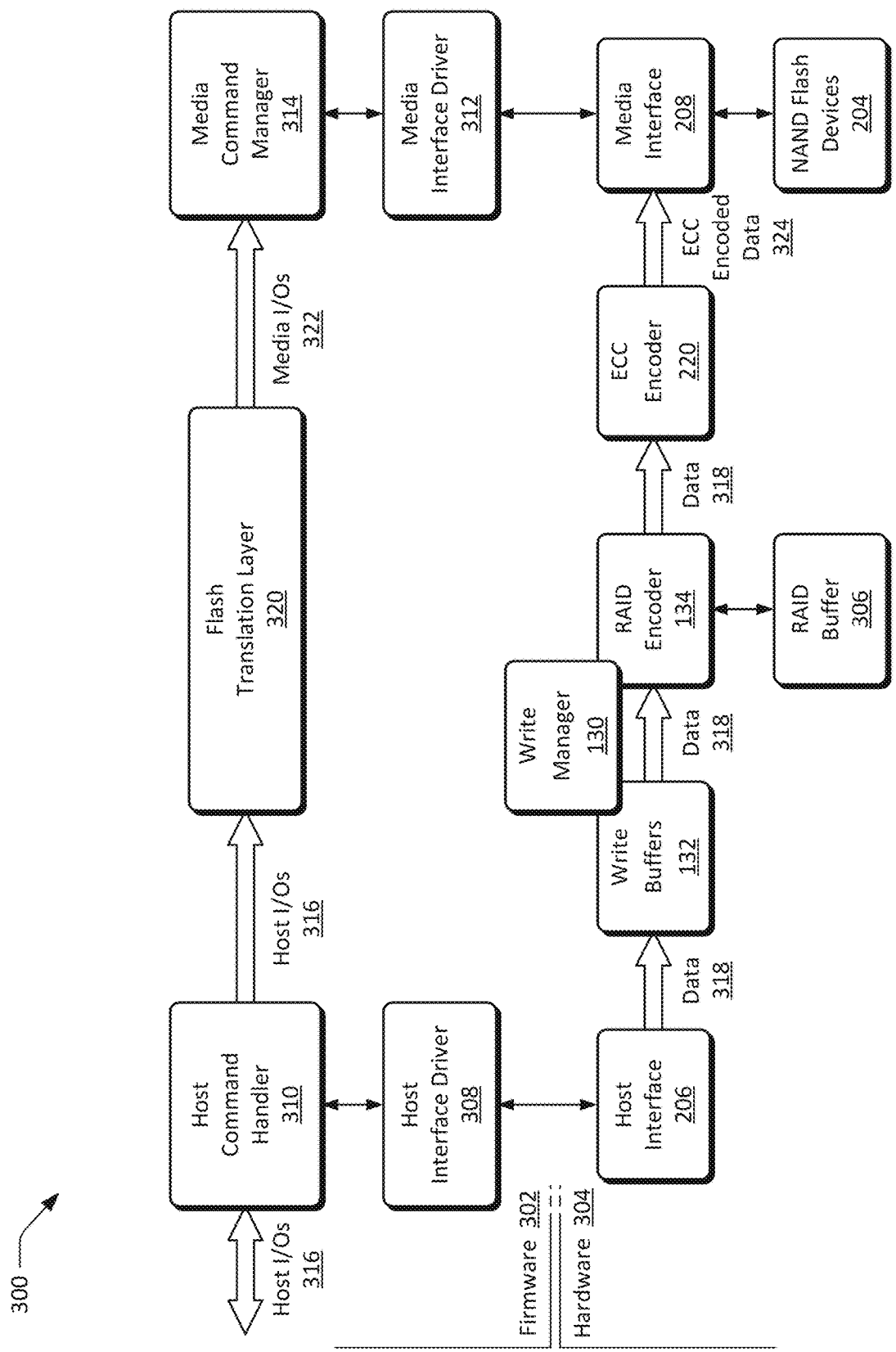
FIG. 3 illustrates example configurations of various hardware and firmware components for implementing aspects of storage media programming with adaptive write buffer release.

FIG. 3 illustrates at 300 example configurations of various hardware and firmware components for implementing aspects of storage media programming with adaptive write buffer release. In this example, the components of the storage controller 126 are shown as abstracted entities that may be implemented in firmware 302 and/or hardware 304 of the storage controller. This is but one example implementation of various components, any of which may be implemented separately from or in combination with other components described herein. Alternately or additionally, any of the components described with reference to FIG. 2 or FIG. 3 may be implemented as an intellectual property block (IP block) or IP core configured as a unit of logic, cell, and/or integrated-circuit (IC) that provides various described features of a component. For example, a component of the storage controller 126 (e.g., media write manager 130) may be implemented as an IP core or the IP block that includes a combination of hardware, firmware, or software to provide respective functionalities or implement respective operations of the component.

In this example, the hardware 304 of the storage controller 126 includes NAND flash devices 204, a host interface 206, a media interface 208, processors 210 (not shown), and ECC encoder 220 which may be implemented as described with reference to FIG. 2. The hardware 304 may also include write buffers 132 and the RAID encoder 134, which is operably coupled with a RAID buffer 306. Shown separately in this example, the RAID buffer 306 may be implemented as part of the RAID encoder 134 and store parity information generated or computed by the RAID encoder. The media write manager 130 may be implemented at least partially in hardware 304 and interact with the write buffers 132 or the RAID encoder 134 to perform adaptive release of the write buffers 132 as described throughout this disclosure. Alternately or additionally, the media write manager 130 may execute on the processor cores 210 of the storage controller 126.

Generally, the firmware 302 of the storage controller 126 assists the hardware 304 to manage the data path between the host system 102 and storage media 124. In other words, the firmware 302 may translate commands or requests for data received from the host system 102 to enable access of the storage media 124. As shown in FIG. 3, the firmware 302 includes a host interface driver 308 to implement a host command handler 310 on the host side and a media interface driver 312 to implement media command manager 314 on the storage media side. As shown in FIG. 3, host input/output commands 316 (host I/Os 316) for data 318 (e.g., data corresponding to a write command) are received by the host command handler 310 and sent to an I/O scheduler of a Flash translation layer 320 (FTL 320) of the storage controller 126. The FTL 320 and/or I/O scheduler may process and schedule the host I/Os 316, which may then be performed as corresponding media input/output commands 322 (media I/Os 322) for storage media access through the media command manager 314.

The FTL 320 may manage command processing (e.g., host I/O 316 translation and scheduling) to facilitate movement of host system data 318 within a storage system 114 and/or through a storage controller 126, such as to storage media 124. As shown in FIG. 3, in the context of writing host data to storage media, the FTL 320 processes host I/Os 316 to manage or facilitate movement of the data 318 from the host interface 206 through the data path to the media interface 208, where the data 318 is programmed to the NAND flash devices 204. To do so, the FTL 320 or firmware 302 may manage various components of the hardware 304 to facilitate movement of the data 318 from one component to a next component. For example, the firmware 302 may cause hardware 304 to fetch or move the data 318 from the host interface 206 to the write buffers 132, provide the data 318 (e.g., through transfer or copy) to the RAID encoder 134, and/or provide the data 318 to the ECC encoder 220 for encoding. The firmware 302 may also cause the hardware 304 send the data 318 or ECC-encoded data 324 to the media interface 208 for writing or programming to the NAND flash devices 204.

In various aspects, the media write manager 130 may interact with the write buffers 132, RAID encoder 134, firmware 302, or other components of the hardware 304 to implement aspects of storage media programming with adaptive write buffer release. In some cases, the media write manager 130 monitors the RAID encoder 134 for an indication that computation of parity information for the data 318 (e.g., data of one host write command) is complete. Based on completion of the parity information computation and a copy of the data being storing to another internal buffer (e.g., ECC buffer), the write buffer 130 generates an interrupt to the firmware 302 to cause release of the write buffer 132 storing the data 318 (e.g., data of one host write command) By so doing, the write buffer 132 is freed and may be reused for data 318 of a next write command of the host. This may also enable a storage drive to be implemented with fewer or smaller write buffers without affecting write throughput of the storage drive.

Figure 4A:
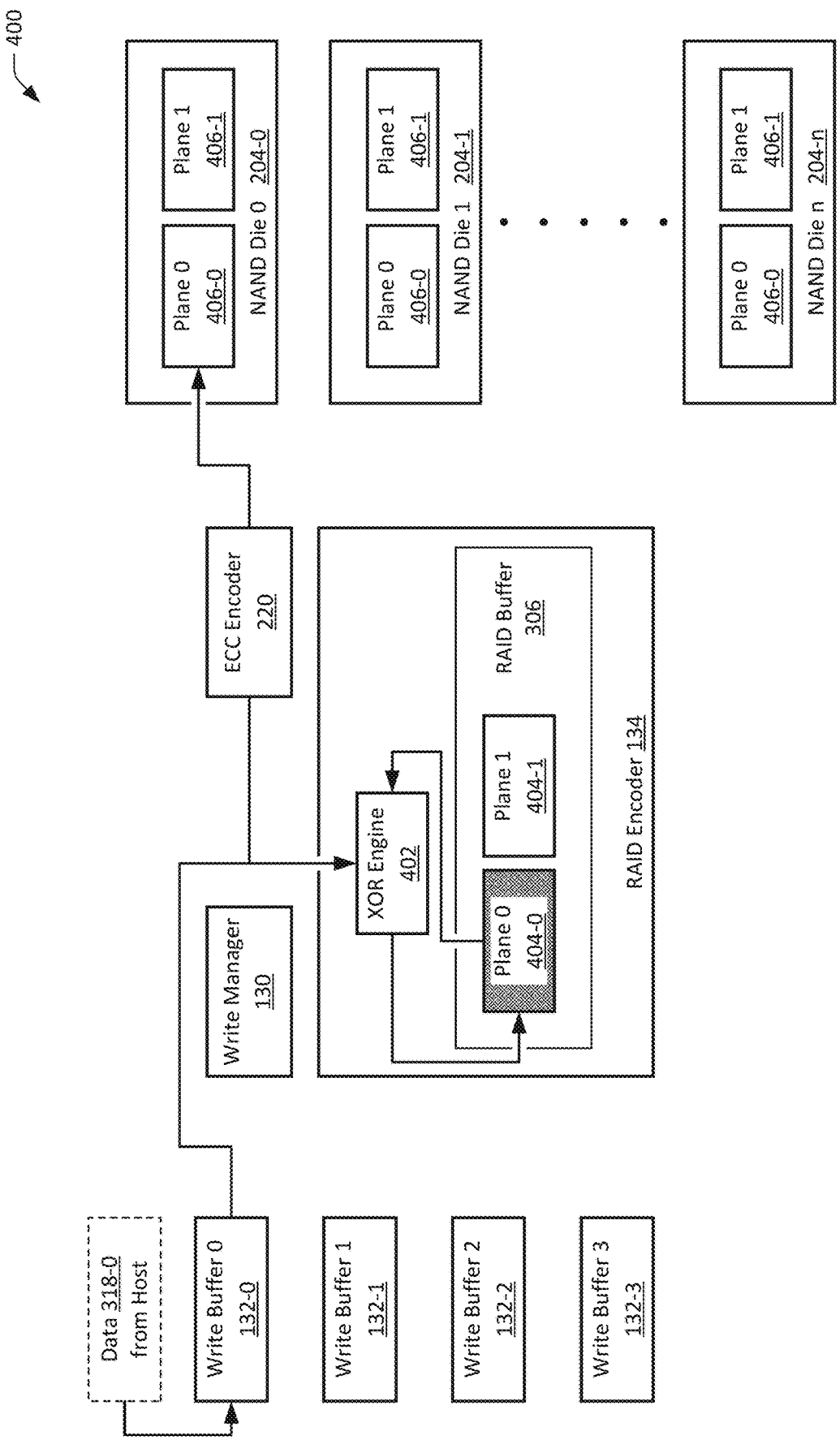
FIGS. 4A-4E illustrate an example of storage media programming with adaptive write buffer release in the context of die-level data redundancy.

FIGS. 4A-4E illustrate an example of storage media programming with adaptive write buffer release in the context of die-level data redundancy. As shown in FIG. 4A at 400, storing host data to storage media generally includes processing and moving data 318 that is received at a write buffer 132 to NAND flash 204 for programming into the NAND media. Here, the NAND flash 204 is illustrated as individual NAND die 1 204-1 through NAND die n 204-n, where n is any suitable integer. Any of the entities of FIGS. 4A-4E may be implemented similarly to corresponding entities as described with reference to FIGS. 1-3. In this example, the storage controller 126 includes an instance of the RAID encoder 134 to implement RAID encoding, which may provide improved data reliability for the storage controller and enable recovery of data lost during NAND programming failures.

Generally, RAID stripes may span memory blocks residing on different dies or planes of storage media. In high code-rate applications (low overhead), a RAID stripe may also include blocks from the same die or plane of storage media. In this example, the RAID encoder 134 is implemented in a die RAID scheme (or die-level RAID), which may protect against failure of a storage media die (e.g., NAND die). In other aspects, a Reed-Solomon code encoder may be implemented in place of the RAID encoder to enable protection against failure events in multiple RAID stripe members (e.g., planes or dies).

As shown in FIG. 4A, a first write buffer 0 132-0 may receive first data 318-0 from a host, such as a host system 102. The first data 318-0 is then provided to the RAID encoder 134 for computation of parity information for the first data 318-0 and provided to the ECC encoder 220 for ECC encoding and programmed to a first plane, plane 0 406-0, of the first NAND die 0 204-0. Generally, the data in the first write buffer 0 132-0 may be transferred to the ECC encoder and/or storage media in parallel with the RAID encoder for XOR generation. As such, the first write buffer 0 132-0 is programmed to the storage media, and the RAID buffer 306 accumulates XOR information until all RAID members have passed through the RAID encoder 134, and then the contents of the RAID buffer 306 can be written to media.

In this example, the RAID encoder 134 includes an XOR engine 402 to compute XOR bits for the first data 318-0, which are stored to a first plane, plane 0 404-0, of the RAID buffer 306. As noted, programming the first data 318-0 to NAND flash may consume much more time (e.g., three to four milliseconds) than computation of the parity information by the RAID encoder 134 (e.g., 40-50 microseconds) or transfer time to the storage media.

Figure 4B:
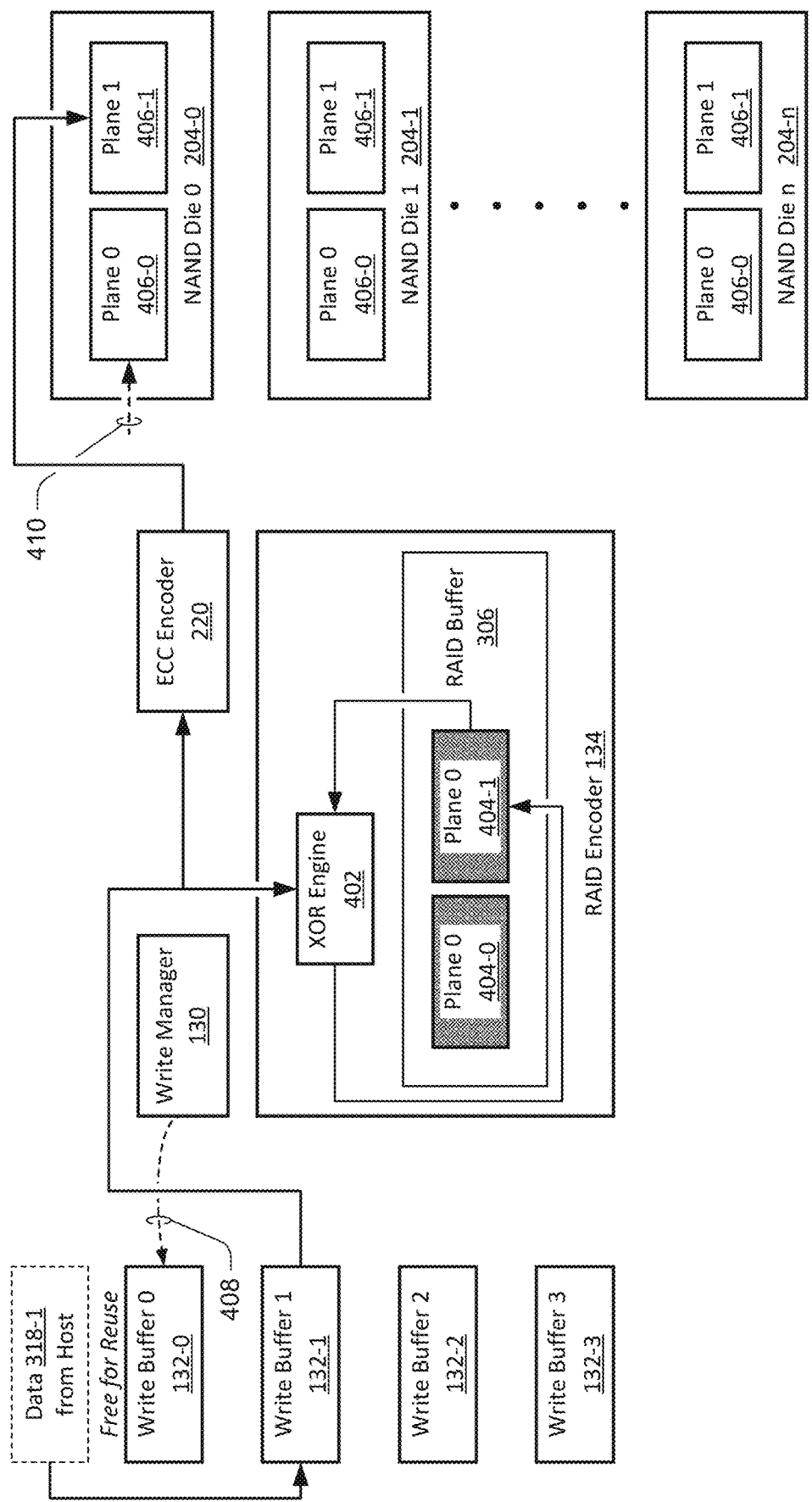

Continuing to FIG. 4B, in response to computation of the XOR bits by the RAID encoder 134, the media write manager 130 may release the first write buffer 0 132-0 as shown at 408. The first write buffer 0 132-0 may be released before or during the programming 410 of the first data 318-0 to the first NAND die 204-0. Thus, the first write buffer 0 132-0 may be released and available for reuse before programming of the first data 318-0 to the NAND flash 204 is complete. In contrast to conventional storage media programming, the first write buffer 0 132-0 may receive additional data from the host before the first data 318-0 completes programming, which may improve write throughput of the storage controller 126 or storage system 114.

As shown in FIG. 4B, the storing of the host data continues as a second write buffer 1 132-1 receives second data 318-1 from the host. The second data 318-1 is then provided to the RAID encoder 134 for computation of parity information for the second data 318-1 and provided to the ECC encoder 220 for ECC encoding and programmed to a second plane, plane 1 406-1, of the first NAND die 0 204-0. The XOR engine 402 computes XOR bits for the second data 318-1, which are stored to a second plane, plane 1 404-1, of the RAID buffer 306.

Figure 4C:
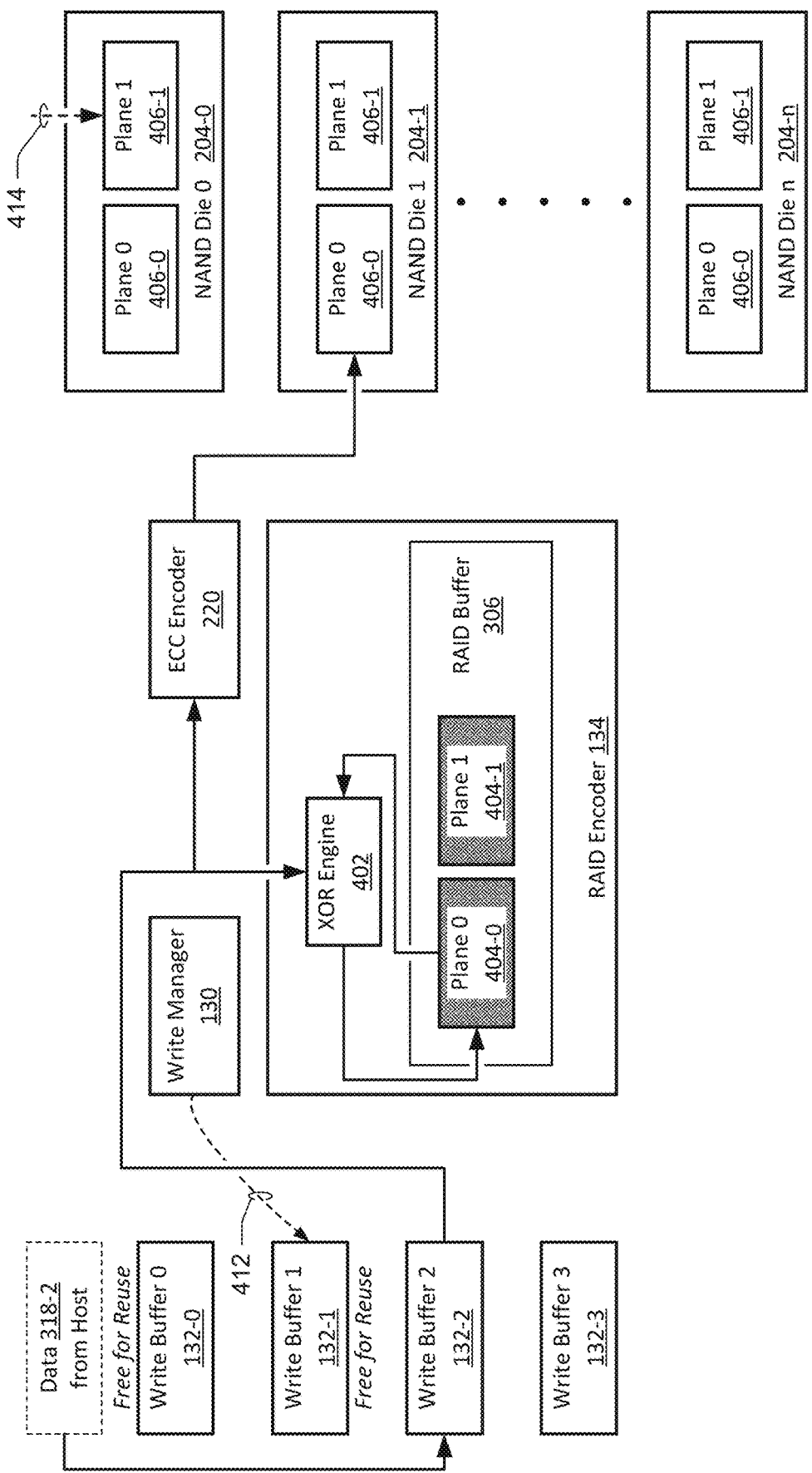

Continuing to FIG. 4C, based on completion of the computation of the XOR bits for the second data 318-1 by the RAID encoder 134, the media write manager 130 may release the second write buffer 1 132-1 as shown at 412. Similarly to the first write buffer 0 132-0, the second write buffer 1 132-1 may be released before or during the programming 414 of the second data 318-1 to the first NAND die 204-0. Thus, the second write buffer 1 132-1 may be released and available for reuse before programming of the second data 318-1 to the NAND flash 204 is complete. In some cases, the first write buffer 0 132-0 and the second write buffer 1 132-1 may be released for reuse before programming of the second data 318-1 to the NAND flash 204 is complete.

With reference to the storing of the host data in the context of FIG. 4C, a third write buffer 2 132-2 receives third data 318-2 from the host. The third data 318-2 is then provided to the RAID encoder 134 for computation of parity information for the third data 318-2 and provided to the ECC encoder 220 for ECC encoding and programmed to the first plane, plane 0 406-0, of the second NAND die 1 204-1. The XOR engine 402 may compute XOR bits for the third data 318-2, which are stored to the first plane, plane 0 404-0, of the RAID buffer 306.

Figure 4D:
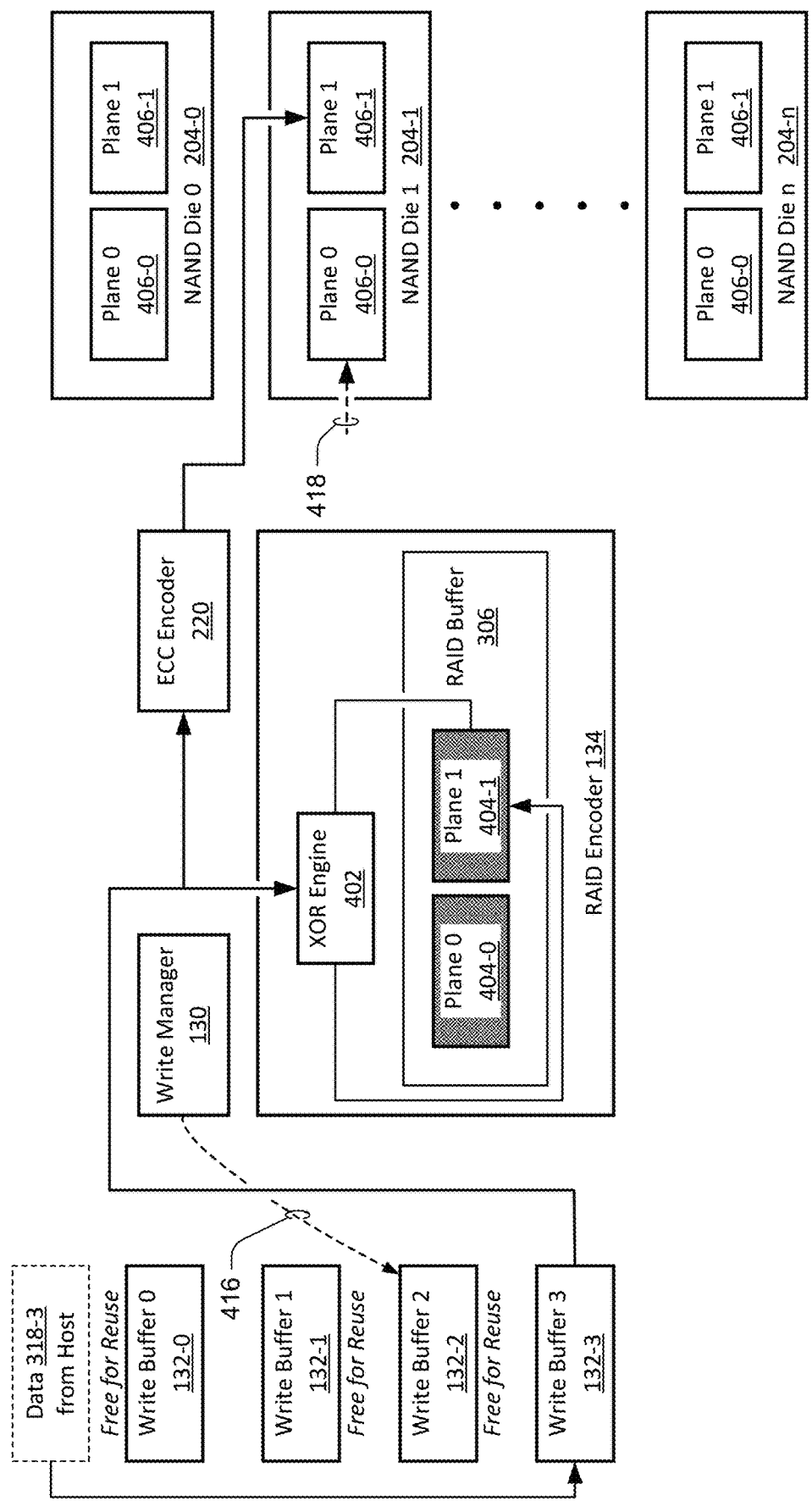

As shown in FIG. 4D, in response to completion of the computation of the XOR bits for the third data 318-2 by the RAID encoder 134, the media write manager 130 releases the third write buffer 2 132-2 as shown at 416. The third write buffer 2 132-2 may be released before or during the programming 418 of the third data 318-2 to the second NAND die 204-1. Thus, the third write buffer 2 132-2 may be released and available for reuse before programming of the third data 318-2 to the NAND flash 204 is complete. In some cases, the first write buffer 0 132-0, the second write buffer 1 132-1, and third write buffer 2 132-2 may be released for reuse before programming of the third data 318-2 to the NAND flash 204 is complete.

Concluding the storage of the host data in this example, a fourth write buffer 3 132-3 receives fourth data 318-3 from the host. The fourth data 318-3 is then provided to the RAID encoder 134 for computation of parity information for the fourth data 318-3 and provided to the ECC encoder 220 for ECC encoding and programmed to the second plane, plane 1406-1, of the second NAND die 1204-1. The XOR engine 402 computes XOR bits for the fourth data 318-3, which are stored to the second plane, plane 1 404-1, of the RAID buffer 306. Similarly to the other write buffers 132, the media write manager may release the fourth write buffer 3 132-3 on completion of the computation of the parity information for the fourth information 318-3.

Figure 4E:
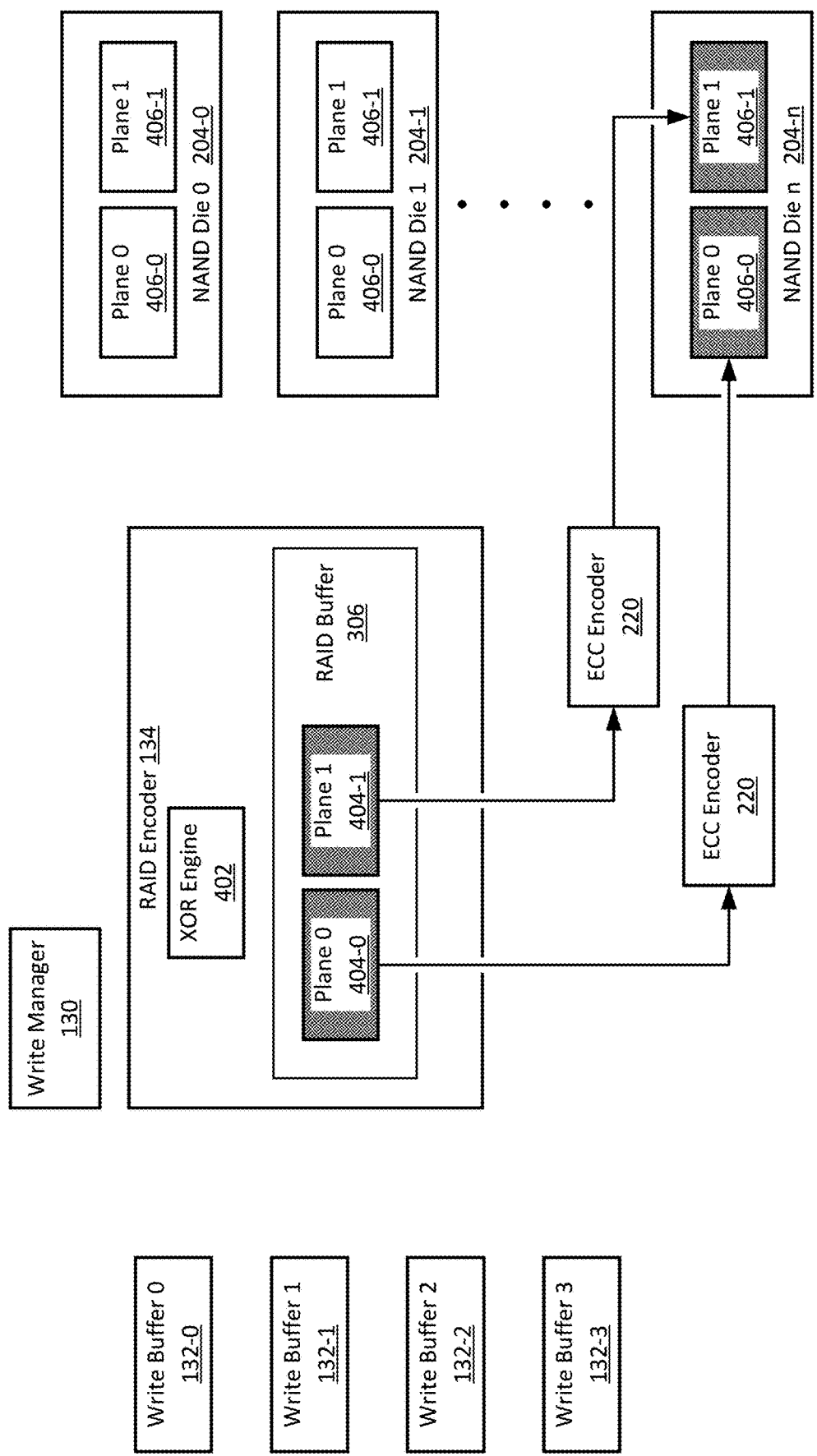

With reference to FIG. 4E, the parity information or XOR bits computed by the RAID encoder 134 may be stored or held in the RAID buffer 306 until programming of a last NAND die 204 completes. In this case of die-level RAID, the parity information of the RAID encoder 134 is programmed from the RAID buffer 306 to both planes 406 of the last NAND die n 204-n of the RAID stripe. By way of review, the data 318 of the host is striped across other NAND die 204 members of the RAID stripe, such as NAND die 0 204-0 through NAND die n-1 (not shown). In this example, the ECC encoder 220 (two instances shown for visual clarity) encodes respective parity information (e.g., XOR bits) of the first plane 0 406-0 and second plane 1 406-1. The ECC-encoded parity information is then programmed to a first plane 0 406-0 and second plane 1 406-1 of the last NAND die n 204-n, respectively. By implementing RAID encoding, data for either plane of a die (e.g., die k<n) that fails to program may also be recovered as shown in Equations 1 and 2.

(Die $k$, plane 0)=(Die 0, plane 0) XOR (Die 1, plane 0) XOR ... XOR (Die $k$–1, plane 0) XOR (Die $k$+1, plane 0) XOR ... XOR (Die $n$, plane 0)     Equation 1: Data recovery for plane 0 of Die $k$ (Die $k$, plane 1)=(Die 0, plane 1) XOR (Die 1, plane 1) XOR ... XOR (Die $k$–1, plane 1) XOR (Die $k$+1, plane 1) XOR ... XOR (Die $n$, plane 1)     Equation 2: Data recovery for plane 1 of Die $k$ In the event that programming of the parity information to die n fails, this parity information may be held in the RAID buffer 306 until programming of die n completes, such that the parity data is recoverable directly from the RAID buffer 306.

Alternatively, the RAID buffer 306 may also be released early as soon as all (non-parity) members of a RAID stripe are known to have programmed to storage media successfully. In such cases, RAID buffer 306 can be released early, and if the programming to storage media fails, the parity information can be reconstructed by reading all the RAID members again. Alternatively, when there is no need to reconstruct the parity, the stripe may lack RAID protection and the stripe can be relocated elsewhere effective to rebuild the parity information.

Figure 5A:
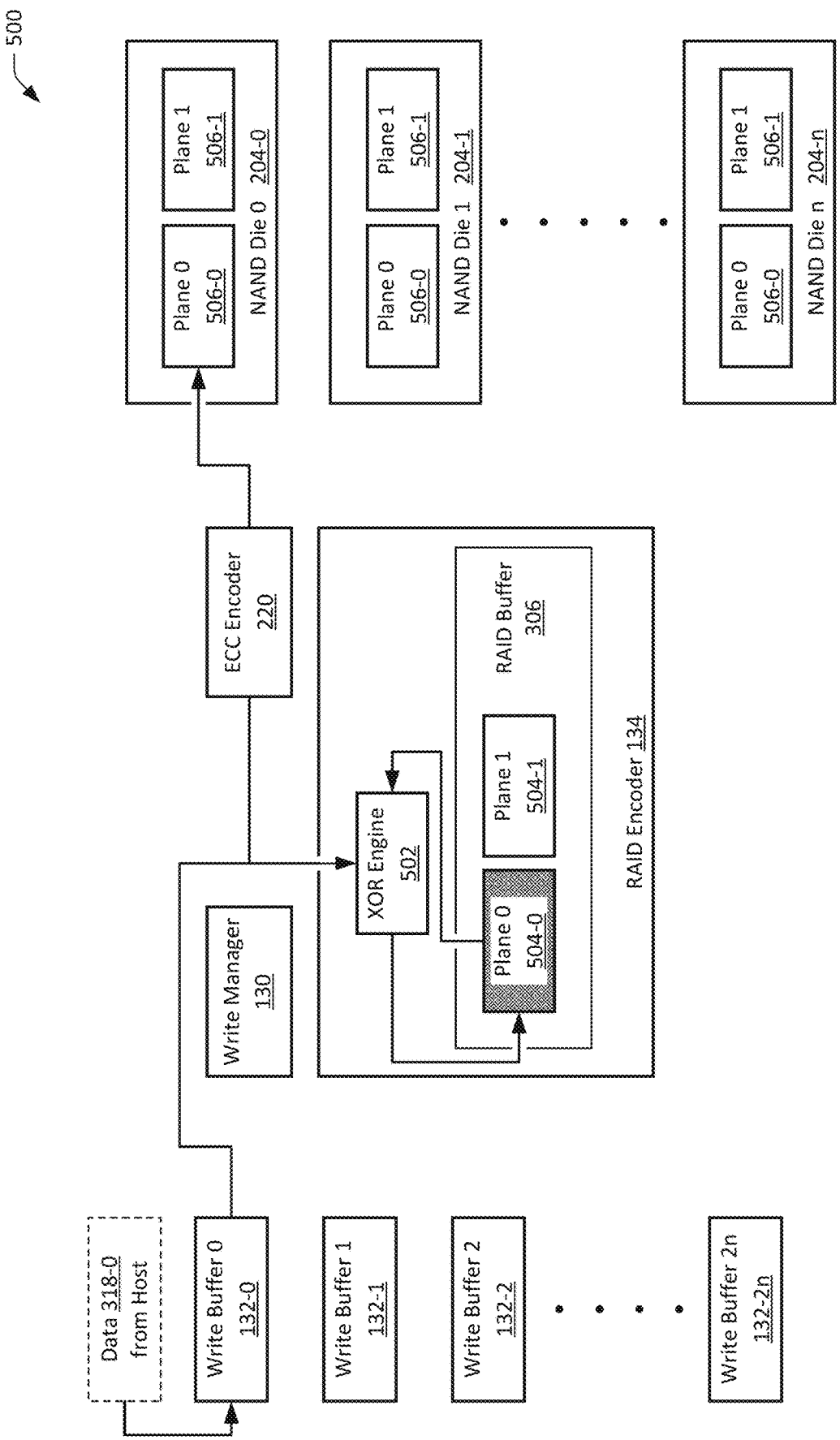
FIGS. 5A-5D illustrates an example of storage media programming with adaptive write buffer release in the context of plane-level data redundancy.

FIGS. 5A-5D illustrates an example of storage media programming with adaptive write buffer release in the context of plane-level data redundancy. As shown in FIG. 5A at 500, storing host data to storage media generally includes processing and moving data 318 that is received at a write buffer 132 to NAND flash 204 for programming into the NAND media. Here, the NAND flash 204 is illustrated as individual NAND die 1 204-1 through NAND die n 204-n, where n is any suitable integer. Any of the entities of FIGS. 5A-5D may be implemented similarly to corresponding entities as described with reference to FIGS. 1-4. In this example, the storage controller 126 includes an instance of the RAID encoder 134 to implement RAID encoding, which may provide improved data reliability for the storage controller and enable recovery of data lost during NAND programming operations (e.g., a block or page failure).

In this example, the RAID encoder 134 is implemented in a plane RAID scheme (or plane-level RAID), which may protect against failure of a storage media plane (e.g., NAND plane). In some cases, the use of plane RAID may reduce computational overhead from that involved in die RAID (e.g., FIGS. 4A-4E). In other aspects, a Reed-Solomon code encoder may be implemented in place of the RAID encoder to enable protection against failure events in multiple RAID stripe members (e.g., planes or dies).

As shown in FIG. 5A, a first write buffer 0 132-0 may receive first data 318-0 from a host, such as a host system 102. The first data 318-0 is then provided to the RAID encoder 134 for computation of parity information for the first data 318-0 and provided to the ECC encoder 220 for ECC encoding and then programmed to a first plane, plane 0 506-0, of the first NAND die 0 204-0. In this example, the RAID encoder 134 includes an XOR engine 502 to compute XOR bits for the first data 318-0, which are stored to a first plane, plane 0 504-0, of the RAID buffer 306. As noted, programming the first data 318-0 may consume much more time than computation of the parity information by the RAID encoder 134 or XOR engine 502.

Figure 5B:
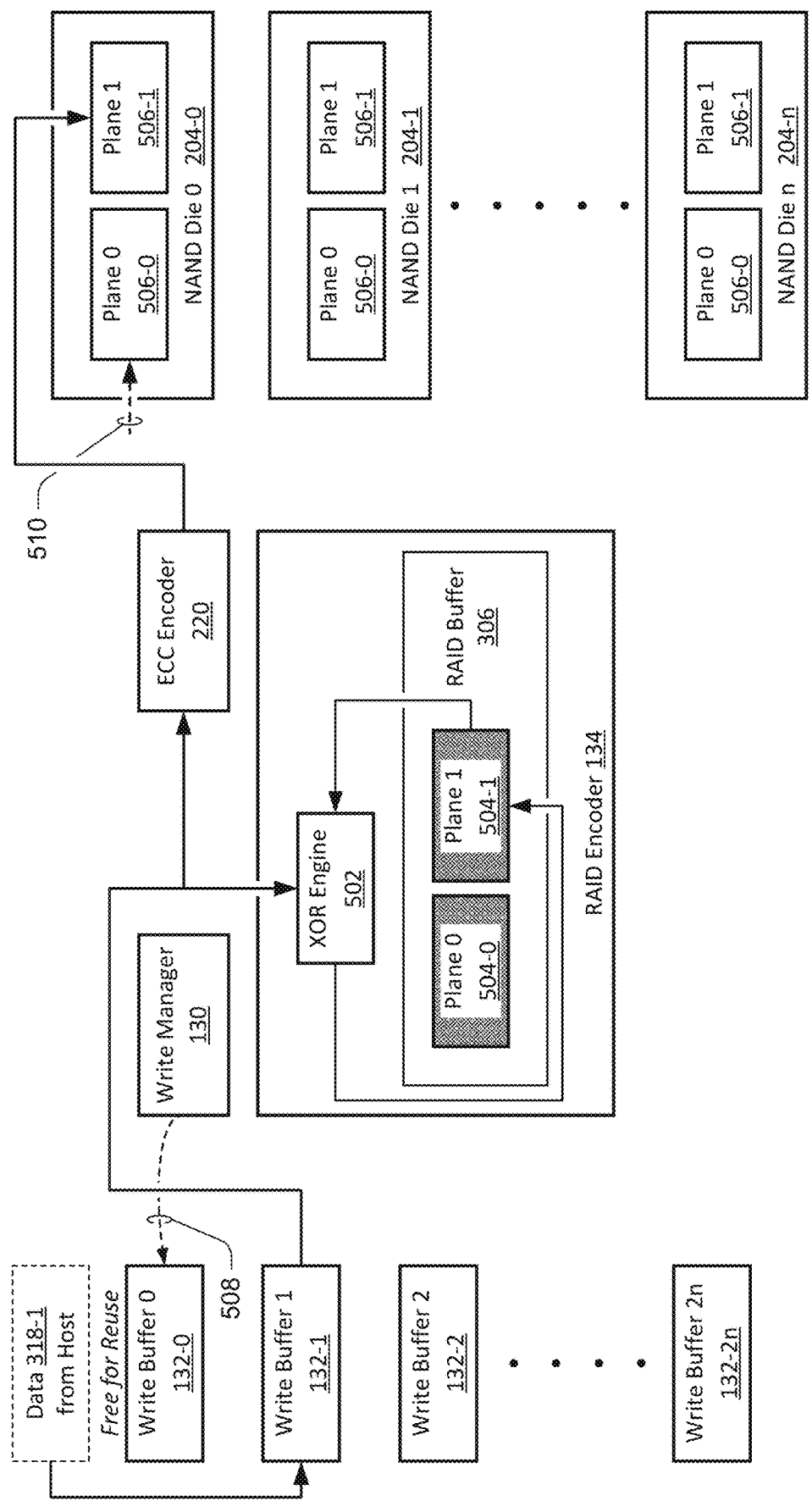

Continuing to FIG. 5B, in response to computation of the XOR bits by the RAID encoder 134, the media write manager 130 may release the first write buffer 0 132-0 as shown at 508. The first write buffer 0 132-0 may be released before or during the programming 510 of the first data 318-0 to the first NAND die 204-0. Thus, the first write buffer 0 132-0 may be released and available for reuse before programming of the first data 318-0 to the NAND flash 204 is complete. In contrast to conventional storage media programming, the first write buffer 0 132-0 may receive additional data from the host before the first data 318-0 completes programming, which may improve write throughput of the storage controller 126 or storage system 114.

As shown in FIG. 5B, the storing of the host data continues as a second write buffer 1 132-1 receives second data 318-1 from the host. The second data 318-1 is then provided to the RAID encoder 134 for computation of parity information for the second data 318-1 and provided to the ECC encoder 220 for ECC encoding and then programmed to a second plane, plane 1 506-1, of the first NAND die 0 204-0. The XOR engine 502 computes XOR bits for the second data 318-1, which are stored to a second plane, plane 1 504-1, of the RAID buffer 306.

Figure 5C:
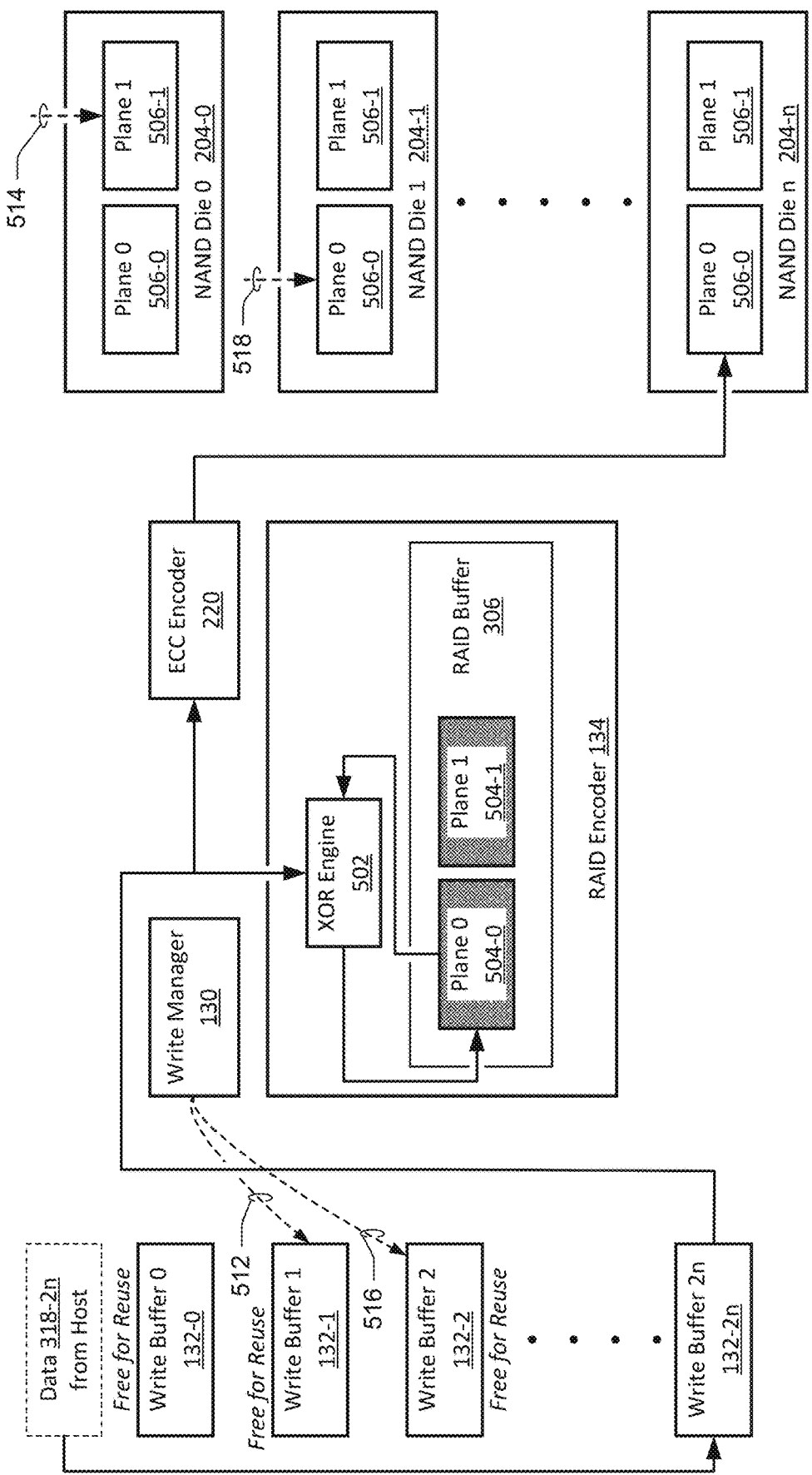

Continuing to FIG. 5C, based on completion of the computation of the XOR bits for the second data 318-1 by the RAID encoder 134, the media write manager 130 may release the second write buffer 1 132-1 as shown at 512. Similarly to the first write buffer 0 132-0, the second write buffer 1 132-1 may be released before or during the programming 514 of the second data 318-1 to the first NAND die 204-0. Thus, the second write buffer 1 132-1 may be released and available for reuse before programming of the second data 318-1 to the NAND flash 204 is complete. Here, assume that parity information has also been calculated for third data (not shown), which has been sent to a programming interface of the NAND flash 204. In response to computation of the parity information for the third data, the media write manager 130 releases the third write buffer 2 132-2 as shown at 516. As such, the release of the third write buffer 2 132-2 may occur before or during the programming 518 of the third data, freeing the third write buffer 2 132-2 for reuse before the corresponding data is programmed into the NAND flash 204.

Concluding the storage of the host data as shown in FIG. 5C, a last write buffer 2n 132-2n (e.g., last for the stripe) receives, from the host, data 318-2n for the last plane member of the RAID stripe. The data 318-2n is then provided to the RAID encoder 134 for computation of parity information for the data 318-2n and provided to the ECC encoder 220 for ECC encoding and programmed to the first plane, plane 0 506-0, of the $n^{th}$ NAND die n 204-n. The XOR engine 502 computes XOR bits for the data 318-2n, which are stored to a first plane, plane 0 504-0, of the RAID buffer 306. Similarly to the other write buffers 132, the media write manager may release the last write buffer 2n 132-2n on completion of the computation of the parity information for the information 318-2n.

Figure 5D:
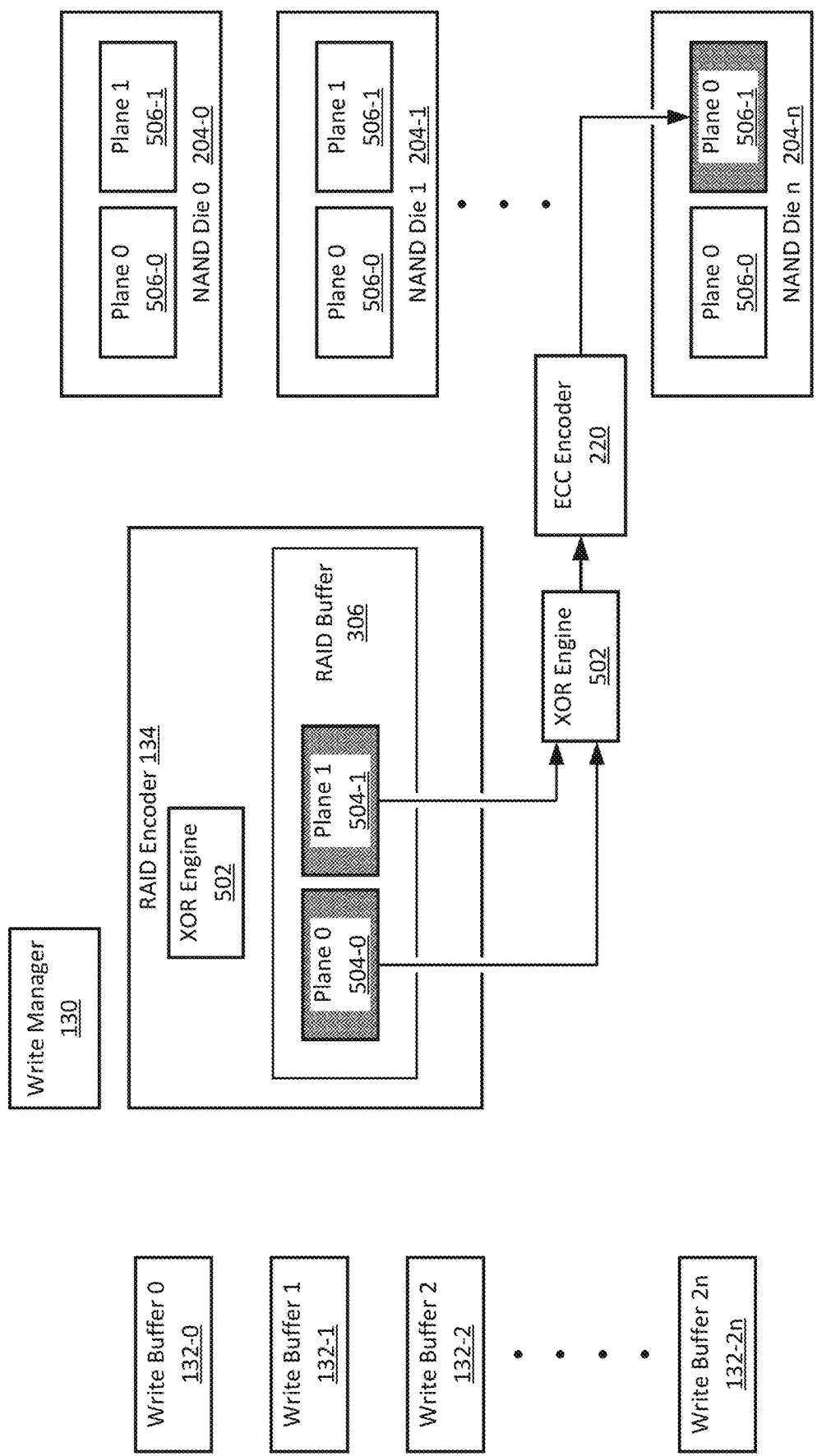

With reference to FIG. 5D, the parity information or XOR bits computed by the RAID encoder 134 may be stored or held in the RAID buffer 306 until programming of a last NAND die 204 completes. In this case of plane-level RAID, the parity information for each plane (504-0 and 504-1) of the RAID encoder 134 is combined through an XOR operation before programming to a second plane, plane 0 506-1, of the last NAND die n 204-n of the RAID stripe. By way of review, the data 318 of the host is striped across other NAND plane members of the RAID stripe, such as the planes of NAND die 0 204-0 through the first plane of NAND die n. In this example, the ECC encoder 220 encodes the combined parity information (e.g., XOR bits) of the first plane 0 506-0 and second plane 1 506-1. The ECC-encoded parity information is then programmed to a second plane 1 506-1 of the last NAND die n 204-n. By implementing RAID encoding, data for either plane of a die (e.g., die k<n) that fails to program may also be recovered as shown in Equations 3 and 4.

(Die $k$, plane 0)=(Die 0, plane 0) XOR (Die 1, plane 0) XOR . . . XOR (Die $k$−1, plane 0) XOR (Die $k$+1, plane 0) XOR . . . XOR (Die $n$, plane 0)   Equation 3: Data recovery for plane 0 of Die $k$ (Die $k$, plane 1)=(Die 0, plane 1) XOR (Die 1, plane 1) XOR . . . XOR (Die $k$−1, plane 1) XOR (Die $k$+1, plane 1) XOR . . . XOR (Die $n$, plane 1)   Equation 4: Data recovery for plane 1 of Die $k$ In the event that programming of the parity information to die n fails, this parity information may be held in the RAID buffer 306 until programming of the second plane of die n completes, such that the parity data is recoverable directly from the RAID buffer 306. These are but a few examples of storage media programming with adaptive write buffer release, other of which are enabled and described throughout this disclosure.

Techniques for Adaptive Write Buffer Release and Data Recovery

The following discussion describes techniques for storage media programming with adaptive write buffer release and/or parity-based data recovery. These techniques may be implemented using any of the environments and entities described herein, such as the media write manager 130, write buffers 132, and/or RAID encoder 134. These techniques include various methods illustrated in FIGS. 6-8, each of which is shown as a set of operations that may be performed by one or more entities.

The methods 600 through 800 are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. In portions of the following discussion, reference will be made to the operating environment 100 of FIG. 1 and various entities or configurations of FIGS. 2-5D by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 9 and/or the storage system controller of FIG. 10.

Figure 6:
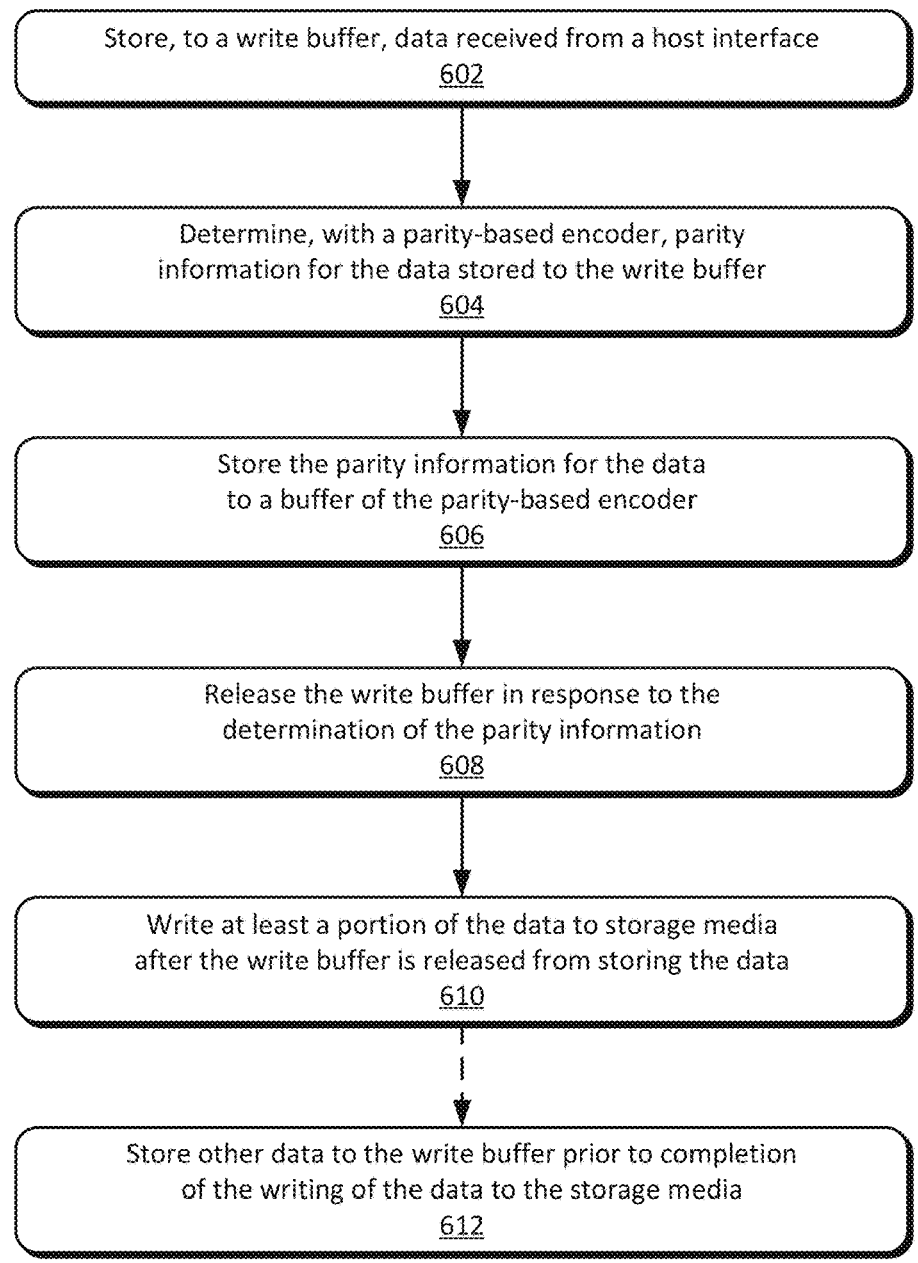
FIG. 6 depicts an example method for storage media programming with adaptive write buffer release in accordance with one or more aspects.

FIG. 6 depicts an example method 600 for storage media programming with adaptive write buffer release, including operations performed by or with the media write manager 130, write buffers 132, or RAID encoder 134 of a storage media controller.

At 602, data received from a host interface is stored to a write buffer. The write buffer may be implemented in SRAM or DRAM of a storage controller. In some cases, the data received from the host interface corresponds to a write command of a host system from which the data is received via the host interface. The write command may specify a destination for the data in storage media, such as NAND flash of a storage system.

At 604, parity information is determined for the data stored to the write buffer with a parity-based encoder. Before or during determination of the parity information the data may also be transferred to an internal buffer of the storage system or to the storage media. The parity-based encoder may include a RAID encoder with an XOR engine or XOR buffer for determining the parity information (e.g., XOR bits). The parity information may correspond to the data to be written to a plane or a die of storage media and other data written to at least one other plane or one other die of the storage media. For example, the parity data may correspond to XOR bits for data members of a RAID stripe that spans multiple dies or planes of NAND flash.

At 606, the parity information for the data is stored to a buffer of the parity-based encoder. The parity information may be stored to a plane of the buffer based on a respective plane in storage media to which the data is programmed. Alternately or additionally, the parity information for the data and other data may be held in the buffer of the parity-based encoder until the parity information is successfully programmed into storage media.

At 608, the write buffer is released in response to the determination of the parity information. The write buffer is released before the data is completely programmed in the storage media. The parity-based encoder may provide a notification indicating completion of the determination of the parity information. In some cases, the parity-based encoder is monitored to detect when the determination or computation of the parity information is complete and/or stored to the buffer of the parity-based encoder. In response to the notification or detection of the completed determination of the parity information, a notification or interrupt may be sent to firmware of a storage controller to cause release of the write buffer. When released, the write buffer is available for reuse, such as to receive subsequent data from the host interface.

At 610, at least a portion of the data is written to storage media after the write buffer is released from storing the data. Because the write buffer is released after determining the parity information, the write buffer may be released before the data is written or programmed to the storage media. As such, writing or programming of the data to the storage media may continue after release of the write buffer. In the event of a programming failure, the data may be recovered based on the parity information and without use of data previously held in the write buffer.

Optionally at 612, other data is stored to the write buffer prior to completion of the writing of the data to the storage media. As noted, the programming of the data may continue after release of the write buffer, which is free for reuse by firmware or other components of the storage controller. In some cases, additional data is stored to the write buffer while the previous data is being programmed to the storage media. By freeing and reusing write buffers, aspects of adaptive buffer release may improve write buffer utilization or increase write throughput of the storage media.

Figure 7:
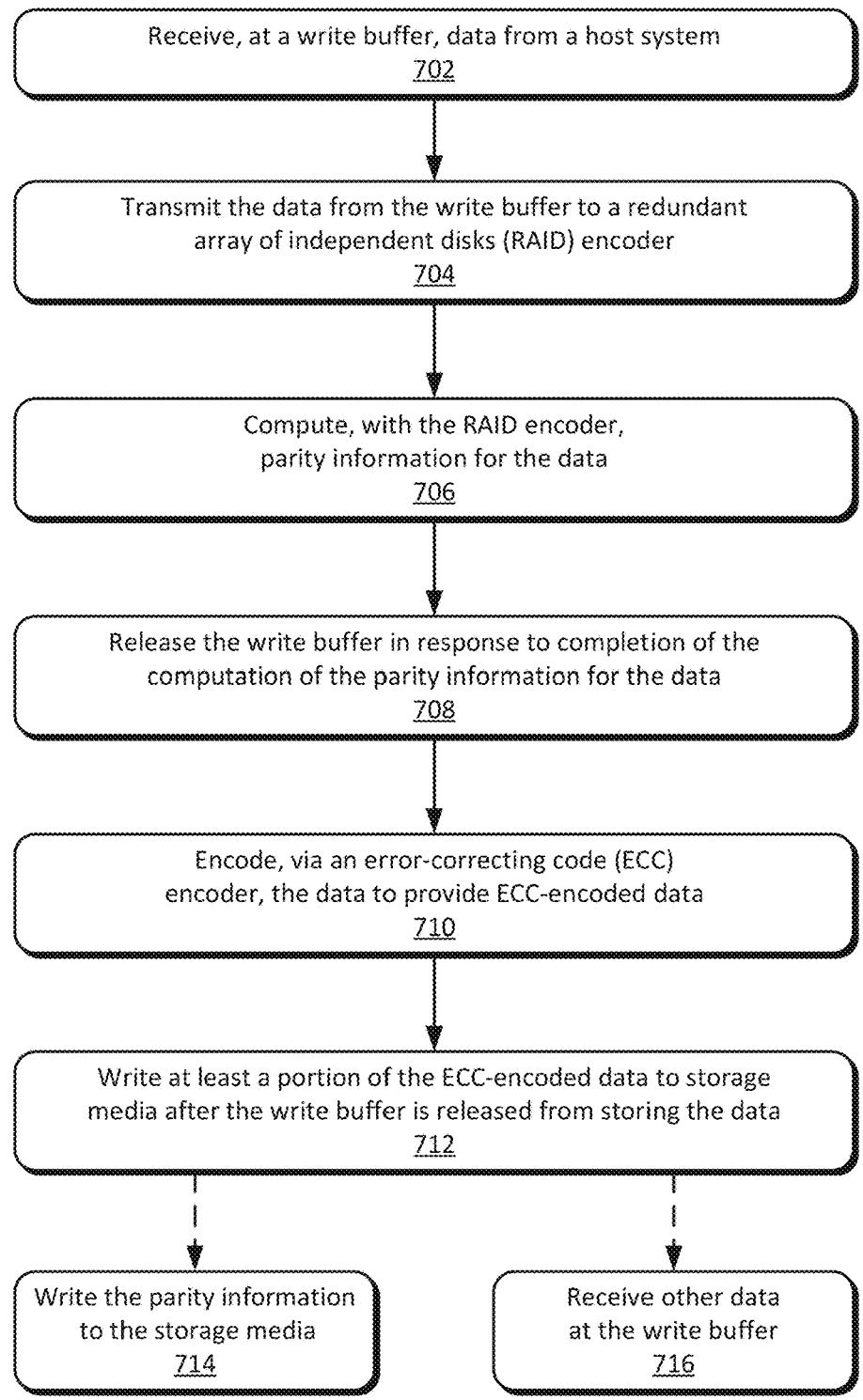
FIG. 7 depicts an example method for releasing a write buffer based on computation of parity information.

FIG. 7 depicts an example method 700 for releasing a write buffer based on computation of parity information, including operations performed by or with the media write manager 130, write buffers 132, and/or RAID encoder 134 of a storage media controller.

At 702, data from a host system is received at a write buffer. The data is received from the host system through a host interface of a storage controller. In some cases, the data is received or fetched from the host system as part of an I/O command to write the data to storage media associated with the storage controller.

At 704, the data is transmitted from the write buffer to a RAID encoder. Generally, the data is transmitted, transferred, or sent to the RAID encoder while another internal buffer of the storage system maintains the data. In other words, the RAID encoder may process the data while another buffer holds a copy of the data or the data is sent to the storage media for programming By so doing, the host system may be relieved of the data (e.g., cache on mode) and the storage controller has a local copy in the event of a data processing or programming failure.

At 706, parity information is computed for the data with the RAID encoder. The RAID encoder may include an XOR engine or XOR buffer for computing or generating XOR bits for the data in the write buffer. The XOR bits (or parity information for the data) may be held in a buffer of the parity-based encoder. In some cases, the RAID encoder is configured to generate an interrupt or provide a notification that computation of the parity information is complete. For example, the RAID encoder may provide an interrupt to firmware of the storage controller indicating that computation of the parity information is complete and/or the parity information for the data is held in a buffer of the RAID encoder.

At 708, the write buffer is released in response to completion of the computation of the parity information for the data. Prior to release of the write buffer, the data may be copied to another internal buffer of the storage system or programmed to the storage media. The write buffer may be released before the data is completely programmed in the storage media. In some cases, the write buffer is released before programming of the data to the storage media starts. Alternately or additionally, the write buffer may be released in response to an interrupt or notification provided by the RAID encoder, ECC encoder, or other component of the storage controller.

At 710, the data is encoded with an ECC encoder to provide ECC-encoded data. The ECC encoder may encode the data after RAID encoding or in parallel with the RAID encoding. In some cases, the ECC encoder receives the data from the RAID encoder after the computation of the parity information from the data.

At 712, at least a portion of the ECC-encoded data is written to the storage media after the write buffer is released from storing the data. Because the write buffer is released after determining the parity information, the write buffer may be released before or while the data is ECC-encoded by the ECC encoder. As such, writing or programming of the ECC-encoded data to the storage media may occur or continue after release of the write buffer. In the event of a programming failure, the data may be recovered based on the parity information and without use of data previously held in the write buffer.

Optionally at 714, the parity information is written to the storage media. The parity information may be written to any suitable region of the storage media, such as a last die or plane of a RAID stripe. Generally, the parity information may be written to a last member of the RAID stripe while the parity information is held by the RAID buffer. By so doing, the parity information may be recovered from the RAID buffer in the event of a storage media programming failure.

Optionally at 716, other data is received at the write buffer. As noted, the programming of the ECC-encoded data may continue after release of the write buffer, which is free for reuse by firmware or other components of the storage controller. In some cases, other data is received at the write buffer while the previous data is being programmed to the storage media. By freeing and reusing write buffers, aspects of adaptive buffer release may improve write buffer utilization or increase write throughput of the storage media.

Figure 8:
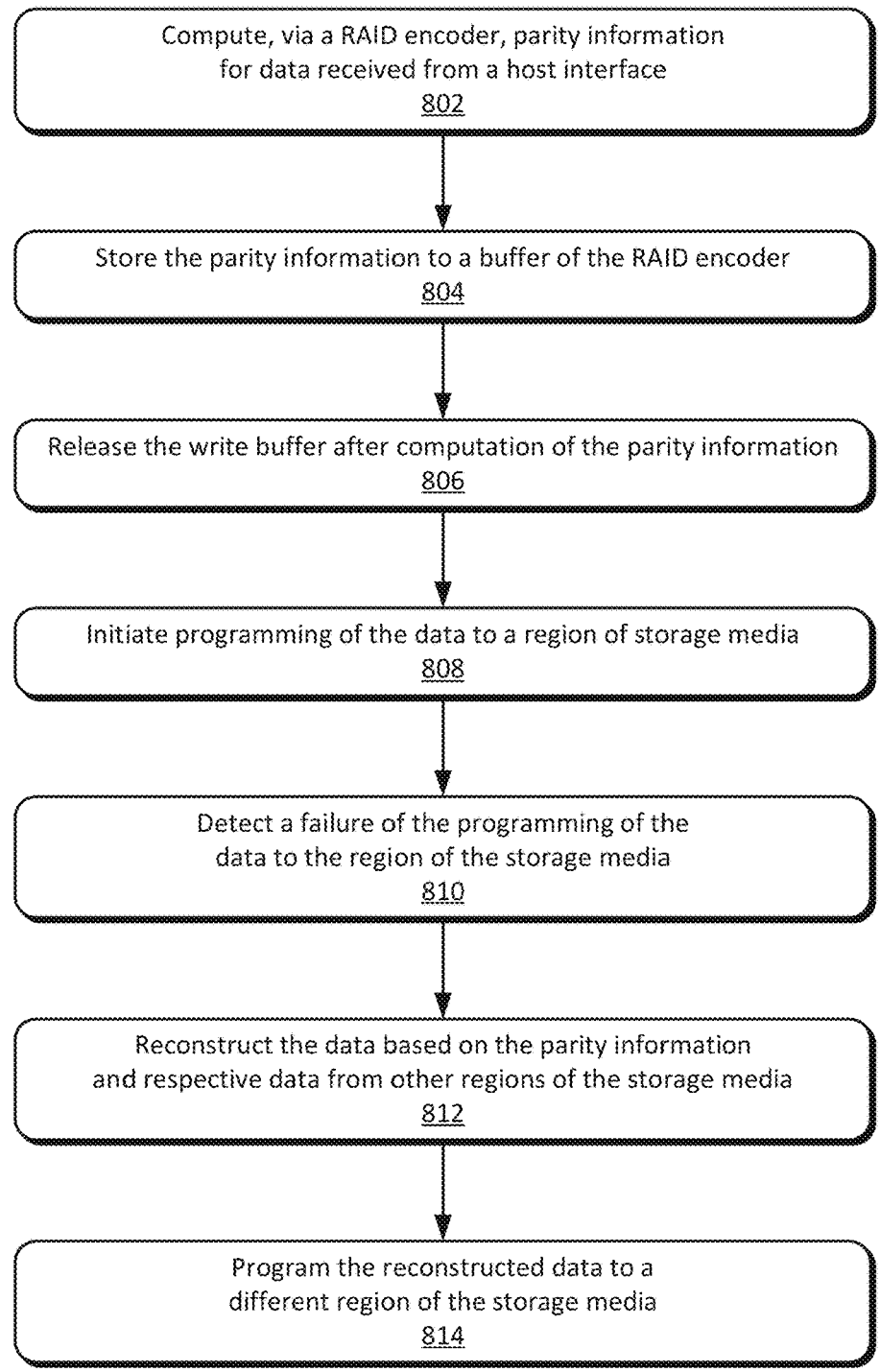
FIG. 8 depicts an example method for recovering from a programming failure with parity-based data reconstruction.

FIG. 8 depicts an example method 800 for recovering from a programming failure with parity-based data reconstruction, including operations performed by or with the media write manager 130, write buffers 132, and/or RAID encoder 134 of a storage media controller.

At 802, parity information is computed, with a RAID encoder, for data received from a host interface. The RAID encoder may include an XOR engine or XOR buffer for computing or generating XOR bits for the data in the write buffer.

At 804, the parity information is stored to a buffer of the RAID encoder. The XOR bits (or parity information for the data) may be held in a buffer of the parity-based encoder. In some cases, the RAID encoder is configured to generate an interrupt or provide a notification that computation of the parity information is complete.

At 806, the write buffer is released after computation of the parity information. The write buffer may be released before the data is completely programmed in the storage media. Alternately or additionally, the write buffer may be released in response to an interrupt or notification provided by the RAID encoder, ECC encoder, media write manager, or other component of the storage controller.

At 808, programming of the data to a region of storage media is initiated. The data may be released to a storage media interface for programming to the region (e.g., block, plane, or die) of the storage media. In some cases, the data is sent, via a flash memory interface of the storage controller, to a flash memory controller for programming to the region of flash memory. For example, a media I/O provide with the data may specify that the flash memory controller is to write the data to a plane of the storage media.

At 810, a programming failure is detected for the programming of the data to the storage media. The programming failure may include a page failure, block failure, plane failure, die failure, or the like. The failure of the programming may be detected after the write buffer is released from storing the data.

At 812, the data is reconstructed based on the parity information and respective data from other regions of the storage media. By implementing RAID, the storage controller may reconstruct the lost data of the programming failure based on the parity information in the RAID buffer and data from other members (e.g., dies or planes) of the RAID stripe. By so doing, the storage controller is able to reconstruct the data that was previously held by the released write buffer.

At 814, the reconstructed data is programmed to a different region of the storage media. In the event of a programming failure, the storage controller is able to reconstruct the data lost due to the programming failure and attempt to reprogram the data to a different region of the storage media, which may ensure reliability of data managed by the storage controller. Alternately or additionally, the parity information of the RAID buffer may also be reprogrammed to a different region of storage media if a programming failure occurs when attempting to write the parity information to the last member of a RAID stripe. As noted, the parity information is held in the RAID buffer until a successful program to storage media is complete to ensure the ability to recover from such a programming failure. Alternatively, the RAID buffer may also be released while the stripe is relocated and has its parity information regenerated.

System-on-Chip

Figure 9:
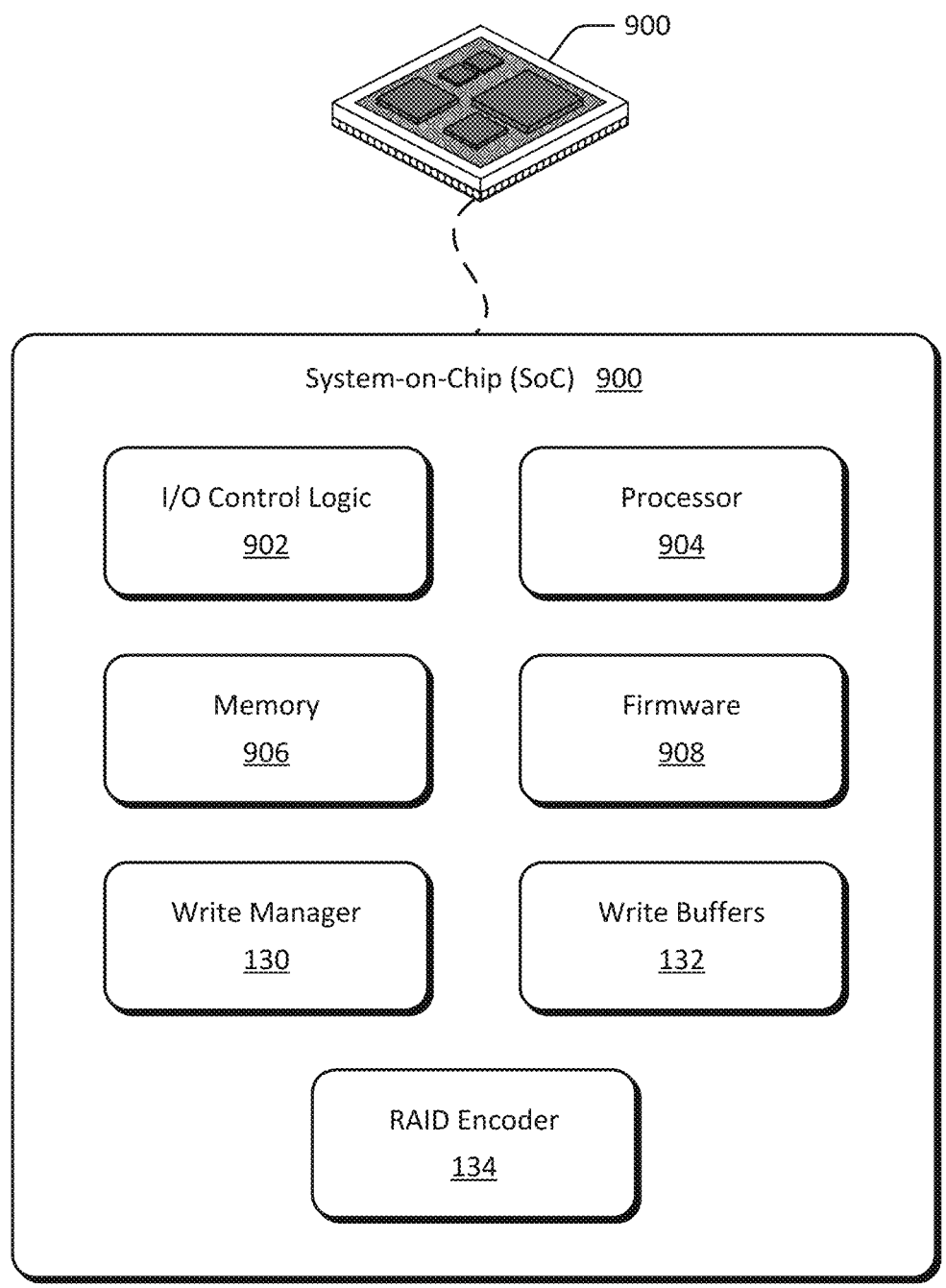
FIG. 9 illustrates an example System-on-Chip (SoC) environment in which aspects of storage media programming with adaptive write buffer release may be implemented.

FIG. 9 illustrates an exemplary System-on-Chip (SoC) 900 that may implement various aspects of storage media programming with adaptive write buffer release. The SoC 900 may be implemented in any suitable system or device, such as a smart-phone, netbook, tablet computer, access point, network-attached storage, camera, smart appliance, printer, set-top box, server, data center, solid-state drive (SSD), hard disk drive (HDD), storage drive array, memory module, automotive computing system, or any other suitable type of device (e.g., others described herein). Although described with reference to a SoC, the entities of FIG. 9 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 900 may be integrated with electronic circuitry, a microprocessor, memory, input-output (I/O) control logic, communication interfaces, firmware, and/or software useful to provide functionalities of a computing device, host system, or storage system, such as any of the devices or components described herein (e.g., storage drive or storage array). The SoC 900 may also include an integrated data bus or interconnect fabric (not shown) that couples the various components of the SoC for control signaling, data communication, and/or routing between the components. The integrated data bus, interconnect fabric, or other components of the SoC 900 may be exposed or accessed through an external port, parallel data interface, serial data interface, fabric-based interface, peripheral component interface, or any other suitable data interface. For example, the components of the SoC 900 may access or control external storage media through an external interface or off-chip data interface.

In this example, the SoC 900 includes various components such as input-output (I/O) control logic 902 and a hardware-based processor 904 (processor 904), such as a microprocessor, processor core, application processor, DSP, or the like. The SoC 900 also includes memory 906, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 904 and code stored on the memory 906 are implemented as a storage system controller or storage aggregator to provide various functionalities associated with storage media programming with adaptive write buffer release. In the context of this disclosure, the memory 906 stores data, code, instructions, or other information via non-transitory signals, and does not include carrier waves or transitory signals. Alternately or additionally, SoC 900 may comprise a data interface (not shown) for accessing additional or expandable off-chip storage media, such as solid-state memory (e.g., Flash or NAND memory), magnetic-based memory media, or optical-based memory media.

The SoC 900 may also include firmware 908, applications, programs, software, and/or operating system, which may be embodied as processor-executable instructions maintained on the memory 906 for execution by the processor 904 to implement functionalities of the SoC 900. The SoC 900 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 900. For example, the SoC 900 may include a transceiver interface configured to enable storage over a wired or wireless network, such as to provide a network attached storage (NAS) volume capable of implementing storage media programming with adaptive write buffer release.

The SoC 900 also includes a media write manager 130, write buffers 132, and RAID encoder 134, which may be implemented separately as shown or combined with a storage component, data interface, or accessible through an off-chip interface. In accordance with various aspects of storage media programming with adaptive write buffer release, the media write manager 130 may interact with the RAID encoder 134 to compute parity information for data stored in a write buffer 132. The media write manager may then release the write buffer in response to computation of the parity information, freeing the write buffer 132 for reuse before or while the data is programmed to storage media. By so doing, the adaptive release of write buffers may result in improved write buffer utilization and increased write throughput of the storage media. Any of these entities may be embodied as disparate or combined components, as described with reference to various aspects presented herein. Examples of these components and/or entities, or corresponding functionality, are described with reference to the respective components or entities of the environment 100 of FIG. 1, respective configurations illustrated in FIGS. 2-5D, and/or methods illustrated in FIGS. 6-8. The media write manager 130, either in whole or part, may be implemented as processor-executable instructions maintained by the memory 906 and executed by the processor 904 to implement various aspects and/or features of storage media programming with adaptive write buffer release.

The media write manager 130, may be implemented independently or in combination with any suitable component or circuitry to implement aspects described herein. For example, the media write manager 130 may be implemented as part of a DSP, processor/storage bridge, I/O bridge, graphics processing unit, memory controller, storage controller, arithmetic logic unit (ALU), or the like. The media write manager 130 may also be provided integral with other entities of SoC 900, such as integrated with the processor 904, memory 906, a storage media interface, or firmware 908 of the SoC 900. Alternately or additionally, the media write manager 130, RAID encoder 134, and/or other components of the SoC 900 may be implemented as hardware, firmware, fixed logic circuitry, or any combination thereof.

Figure 10:
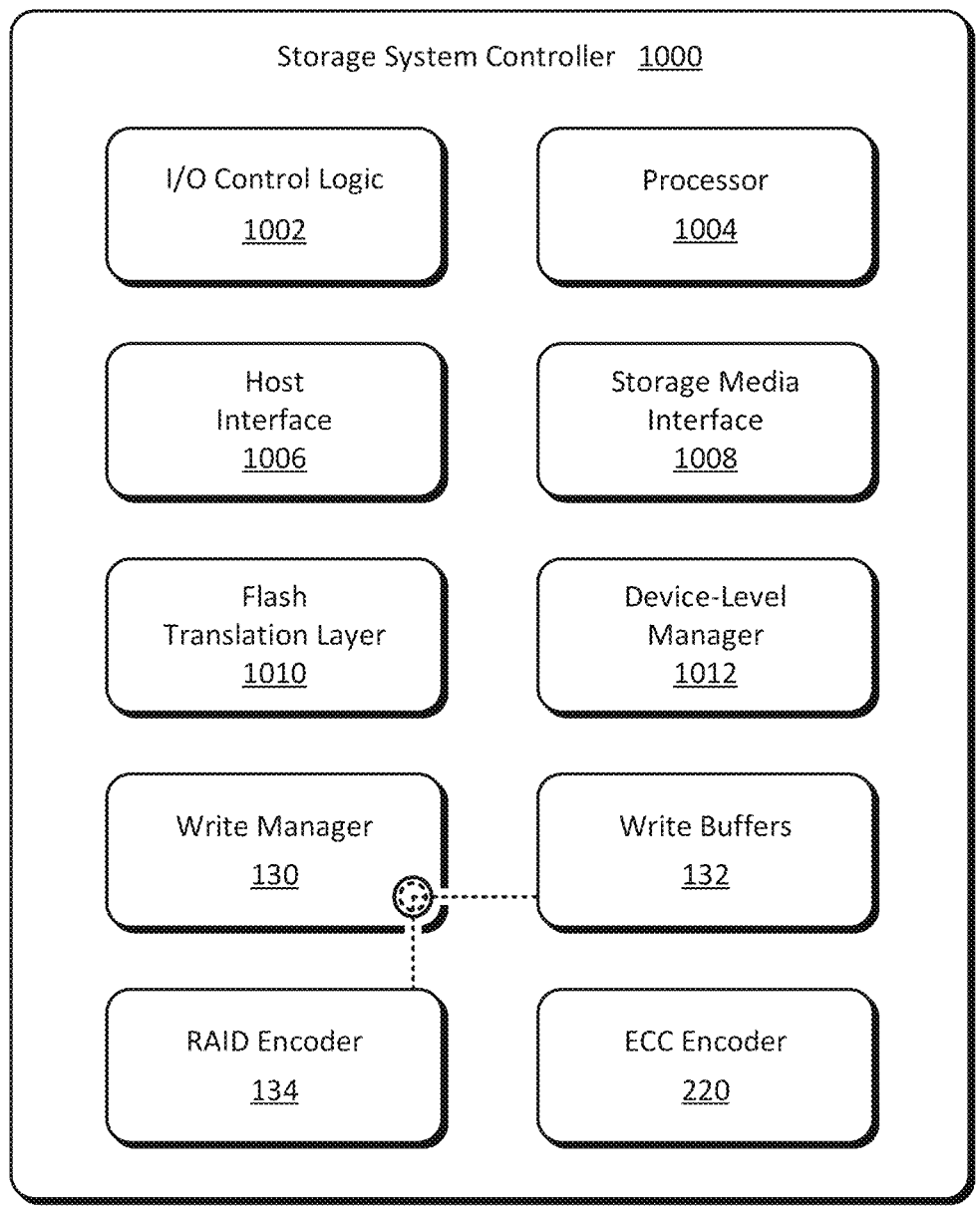
FIG. 10 illustrates an example storage system controller in which a media write manager is implemented in accordance with one or more aspects of the disclosure.

As another example, consider FIG. 10 which illustrates an example storage system controller 1000 in accordance with one or more aspects of storage media programming with adaptive write buffer release. In various aspects, the storage system controller 1000 or any combination of components thereof may be implemented as a storage drive controller, storage media controller, NAS controller, Fabric interface, NVMe target, or storage aggregation controller for solid-state storage media or other types of storage media. In some cases, the storage system controller 1000 is implemented similarly to or with components of the SoC 900 as described with reference to FIG. 9. In other words, an instance of the SoC 900 may be configured as a storage system controller, such as the storage system controller 1000 to manage solid-state (e.g., NAND Flash-based) media.

In this example, the storage system controller 1000 includes input-output (I/O) control logic 1002 and a processor 1004, such as a microprocessor, processor core, application processor, DSP, or the like. In some aspects, the processor 1004 and firmware of the storage system controller 1000 may be implemented to provide various functionalities associated with storage media programming with adaptive write buffer release, such as those described with reference to any of methods 600 through 800. The storage system controller 1000 also includes a host interface 1006 (e.g., SATA, PCIe, NVMe, or Fabric interface) and a storage media interface 1008 (e.g., NAND interface), which enable access to a host system and storage media, respectively. The storage system controller 1000 also includes a Flash translation layer 1010 (FTL 1010), device-level manager 1012, and I/O scheduler (not shown). In some aspects of storage media programming with adaptive write buffer release, the FTL 1010 processes write commands received via the host interface 1006 to manage data movement within or through the storage system controller 1000.

The storage system controller 1000 also includes instances of a media write manager 130, write buffers 132, RAID encoder 134, and ECC encoder 220. Any or all of these components may be implemented separately as shown or combined with the processor 1004, host interface 1006, storage media interface 1008, Flash translation layer 1010, device-level manager 1012, and/or I/O scheduler. Examples of these components and/or entities, or corresponding functionality, are described with reference to the respective components or entities of the environment 100 of FIG. 1 or respective configurations illustrated in FIG. 2-5D. In accordance with various aspects of storage media programming with adaptive write buffer release, the media write manager 130 may In accordance with various aspects of storage media programming with adaptive write buffer release, the media write manager 130 may interact with the RAID encoder 134 to compute parity information for data stored in a write buffer 132. The media write manager may then release the write buffer in response to computation of the parity information, freeing the write buffer 132 for reuse before or while the data is programmed to storage media. By so doing, the adaptive release of write buffers may result in improved write buffer utilization and increased write throughput of the storage media. The media write manager 130, either in whole or part, may be implemented as processor-executable instructions maintained by memory of the controller and executed by the processor 1004 to implement various aspects and/or features of storage media programming with adaptive write buffer release.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A method for storage media programming with adaptive write buffer release, comprising:
   storing, to a write buffer, first data received from a host interface of a storage system that includes storage media;
   determining, with a parity-based encoder, parity information for the first data stored to the write buffer, the parity-based encoder configured to provide parity information that comprises XOR bits;
   releasing the write buffer in response to completion of the determining of the parity information for the first data;
   writing at least a portion of the first data to the storage media of the storage system after the write buffer is released from storing the first data; and
   storing second data to the write buffer prior to completion of the writing of the first data to the storage media of the storage system.

2. The method of claim 1, further comprising storing, while the first data is written to the storage media, the parity information for the first data in a buffer associated with the parity-based encoder.

3. The method of claim 2, further comprising:
   writing the parity information for the first data from the buffer associated with the parity-based encoder to the storage media of the storage system; or
   deleting the parity information for the first data from the buffer associated with the parity-based encoder on completion of the writing of the first data to the storage media of the storage system.

4. The method of claim 1, further comprising:
encoding, via an error-correcting code (ECC) encoder, the first data to provide ECC-encoded data; and
writing the ECC-encoded data to the storage media of the storage system.

5. The method of claim 4, wherein the first data is transmitted from the parity-based encoder to the ECC encoder and the method further comprises:
monitoring the parity-based encoder to detect the completion of the determining of the parity information for the first data; and
notifying, subsequent to transmission of the first data to the ECC encoder, firmware of the storage system to release the write buffer in response to the completion of the determining of the parity information for the first data.

6. The method of claim 1, wherein the parity-based encoder is a redundant array of independent disks (RAID) encoder of the storage system and the parity information includes XOR parity bits computed by the RAID encoder for the first data.

7. The method of claim 1, wherein:
the storage media is flash memory;
the first data is written to a plane of the flash memory or a die of the flash memory;
the second data is written to another plane of the flash memory or another die of the flash memory; and
the parity information corresponds to the first data written to the plane or the die of the flash memory and the second data written to the other plane or the other die of the flash memory.

8. The method of claim 1, wherein the first data is written to a region of the storage media as part of a storage media programming operation and the method further comprises:
detecting a failure of the programming operation to write the first data to the region of the storage media;
reconstructing the first data based on the parity information and respective data from other regions of the storage media; and
writing the reconstructed first data to a different region of the storage media.

9. An apparatus comprising:
a host interface configured for communication with a host system;
write buffers operably coupled to the host interface;
storage media;
a media interface configured to enable access to the storage media;
a parity-based encoder configured to provide parity information that comprises XOR bits; and
a media write manager configured to:
receive, via one of the write buffers, first data from the host interface;
compute, via the parity-based encoder, parity information for the first data received by the write buffer;
store the parity information for the first data to a buffer of the parity-based encoder;
release the write buffer in response to computation of the parity information for the first data, the write buffer released before the first data is written to the storage media of the storage system;
write at least a portion of the first data to the storage media of the apparatus after the write buffer is released from storing the first data; and
receive, via the write buffer that was released, second data from the host interface prior to completion of write of the first data to the storage media of the apparatus.

10. The apparatus of claim 9, wherein the media write manager is further configured to:
write the parity information for the first data from the buffer of the parity-based encoder to the storage media of the apparatus or another memory of the apparatus; or
flush the parity information for the first data from the buffer of the parity-based encoder on completion of the writing of the first data to the storage media of the apparatus.

11. The apparatus of claim 9, further comprising an error-correcting code (ECC) encoder and wherein the media write manager is further configured to:
encode, via the ECC encoder, the first data to provide ECC-encoded data; and
write the ECC-encoded data to the storage media of the apparatus.

12. The apparatus of claim 9, wherein the first data is sent from the parity-based encoder to the ECC encoder and the media write manager is further configured to:
receive a notification from the parity-based encoder indicating completion of the computation of the parity information for the first data; and
generate, subsequent to the first data being sent to the ECC encoder, an interrupt to firmware of the apparatus to cause the release of the write buffer in response to the completion of the computation of the parity information for the first data.

13. The apparatus of claim 9, wherein the first data is written to a region of the storage media as part of a storage media programming operation and the media write manager is further configured to:
detect a failure of the programming operation to write the first data to the region of the storage media;
reconstruct the first data based on the parity information and respective data from other regions of the storage media; and
write the reconstructed first data to a different region of the storage media.

14. The apparatus of claim 9, wherein:
the storage media is flash memory;
the first data is written to a plane of the flash memory or a die of the flash memory;
the second data is written to another plane of the flash memory or another die of the flash memory; and
the parity information corresponds to the first data written to the plane or the die of the flash memory and the second data written to the other plane or the other die of the flash memory.

15. A System-on-Chip (SoC) comprising:
a host interface to communicate with a host system;
write buffers operably coupled with the host interface;
a media interface to access storage media of a storage system;
a parity-based encoder configured to provide parity information that comprises XOR bits;
a hardware-based processor;
a memory storing processor-executable instructions that, responsive to execution by the hardware-based processor, implement a media write manager to:
store, to one of the write buffers, first data received from the host interface;
determine, via the parity-based encoder, parity information for the first data stored to the write buffer;

release the write buffer in response to the determination of the parity information for the first data;

write at least a portion of the first data to the storage media after the write buffer is released from storing the first data; and store, to the write buffer that was released, second data prior to completion of the writing of the first data to the storage media of the storage system.

16. The SoC of claim 15, wherein the media write manager is further implemented to:

store, while the first data is written to the storage media, the parity information for the first data in a buffer associated with the parity-based encoder; or write the parity information for the first data from the buffer associated with the parity-based encoder to the storage media of the storage system.

17. The SoC of claim 15, wherein the media write manager is further implemented to:

receive a notification from the parity-based encoder indicating completion of the determination of the parity information for the first data; and generate an interrupt to firmware of the apparatus to cause the release of the write buffer.

18. The SoC of claim 15, wherein the first data is written to a region of the storage media as part of a storage media programming operation and the media write manager is further configured to:

detect a failure of the programming operation to write the first data to the region of the storage media;

reconstruct the first data based on the parity information and respective data from other regions of the storage media; and write the reconstructed first data to a different region of the storage media.

19. The SoC of claim 15, further comprising an error-correcting code (ECC) encoder and wherein the media write manager is further configured to:

encode, via the ECC encoder, the first data to provide ECC-encoded data; and write the ECC-encoded data to the storage media of the apparatus.

20. The SoC of claim 15, wherein the parity-based encoder is a redundant array of independent disks (RAID) encoder of the SoC and the parity information includes XOR parity bits computed by the RAID encoder for the first data.

* * * * *